United States Patent
Calub et al.

(10) Patent No.: US 9,372,565 B2
(45) Date of Patent: *Jun. 21, 2016

(54) DYNAMIC TACTILE INTERFACE

(71) Applicant: Tactus Technology, Inc., Fremont, CA (US)

(72) Inventors: Ben Guron Calub, Fremont, CA (US); Carl del Rosario, Fremont, CA (US); Mario Garcia, Fremont, CA (US); Michael Hammersley, Fremont, CA (US); Roman Rak, Fremont, CA (US); Curtis Ray, Fremont, CA (US); Micah Yairi, Fremont, CA (US); Nathan Knapp, Fremont, CA (US); Robert Adrian Ray, Fremont, CA (US); Brandon Gregory Miller, Fremont, CA (US); Kyle Gregory, Fremont, CA (US); Maxwell Harshorn Shimshak, Fremont, CA (US); Craig Ciesla, Fremont, CA (US)

(73) Assignee: Tactus Technology, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/552,322

(22) Filed: Nov. 24, 2014

(65) Prior Publication Data

US 2015/0205420 A1 Jul. 23, 2015

Related U.S. Application Data

(60) Provisional application No. 61/907,534, filed on Nov. 22, 2013.

(51) Int. Cl.
*G06F 3/041* (2006.01)
*G06F 3/01* (2006.01)
*G06F 3/0354* (2013.01)

(52) U.S. Cl.
CPC ............ *G06F 3/041* (2013.01); *G06F 3/016* (2013.01); *G06F 3/03545* (2013.01); *G09G 2300/04* (2013.01); *G09G 2300/0404* (2013.01)

(58) Field of Classification Search
CPC ..... G06F 3/016; G06F 3/041; G06F 3/03545; G09G 2300/04; G09G 2300/0404
See application file for complete search history.

(56) References Cited

U.S. PATENT DOCUMENTS

| 2,885,967 A | 5/1959 | C et al. |
| 3,034,628 A | 5/1962 | Wadey |

(Continued)

FOREIGN PATENT DOCUMENTS

| CN | 1260525 A | 7/2000 |
| CN | 1530818 A | 9/2004 |

(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.

(Continued)

*Primary Examiner* — Larry Sternbane
(74) *Attorney, Agent, or Firm* — Jeffrey Schox

(57) ABSTRACT

The dynamic tactile interface includes: a tactile layer defining a peripheral region and a deformable region adjacent the peripheral region and operable between a retracted setting and an expanded setting; a substrate including an attachment surface and coupled to the peripheral region and defining a fluid conduit adjacent the deformable region and a fluid channel fluidly coupled to the fluid conduit; a border region proximal a periphery of the substrate and defining a cavity configured to receive an instrument, the cavity supporting the instrument in a first configuration and releasing the instrument in a second configuration; and a bladder fluidly coupled to the fluid channel and coupled to the cavity, the instrument compressing a portion of the bladder in the first configuration to displace fluid from the bladder into the fluid channel to transition the deformable region from the retracted setting to the expanded setting.

17 Claims, 14 Drawing Sheets

(56) References Cited

U.S. PATENT DOCUMENTS

| | | | |
|---|---|---|---|
| 3,441,111 A | 4/1969 | Spalding | |
| 3,453,967 A | 7/1969 | L et al. | |
| 3,490,733 A | 1/1970 | Jean | |
| 3,659,354 A | 5/1972 | Sutherland | |
| 3,759,108 A | 9/1973 | Borom et al. | |
| 3,780,236 A | 12/1973 | Gross | |
| 3,818,487 A | 6/1974 | Brody et al. | |
| 4,109,118 A | 8/1978 | Kley | |
| 4,181,476 A | 1/1980 | Malbec | |
| 4,209,819 A | 6/1980 | Seignemartin | |
| 4,290,343 A | 9/1981 | Gram | |
| 4,307,268 A | 12/1981 | Harper | |
| 4,467,321 A | 8/1984 | Volnak | |
| 4,477,700 A | 10/1984 | Balash et al. | |
| 4,517,421 A | 5/1985 | Margolin | |
| 4,543,000 A | 9/1985 | Hasenbalg | |
| 4,584,625 A | 4/1986 | Kellogg | |
| 4,700,025 A | 10/1987 | Hatayama et al. | |
| 4,743,895 A | 5/1988 | Alexander | |
| 4,772,205 A | 9/1988 | Chlumsky et al. | |
| 4,920,343 A | 4/1990 | Schwartz | |
| 4,940,734 A | 7/1990 | Ley et al. | |
| 5,090,297 A | 2/1992 | Paynter | |
| 5,194,852 A | 3/1993 | More et al. | |
| 5,195,659 A | 3/1993 | Eiskant | |
| 5,212,473 A | 5/1993 | Louis | |
| 5,222,895 A | 6/1993 | Fricke | |
| 5,286,199 A | 2/1994 | Kipke | |
| 5,346,476 A * | 9/1994 | Elson | A61M 5/148 604/135 |
| 5,369,228 A | 11/1994 | Faust | |
| 5,412,189 A | 5/1995 | Cragun | |
| 5,459,461 A | 10/1995 | Crowley et al. | |
| 5,470,212 A | 11/1995 | Pearce | |
| 5,488,204 A | 1/1996 | Mead et al. | |
| 5,496,174 A | 3/1996 | Garner | |
| 5,666,112 A | 9/1997 | Crowley et al. | |
| 5,717,423 A | 2/1998 | Parker | |
| 5,729,222 A | 3/1998 | Iggulden et al. | |
| 5,742,241 A | 4/1998 | Crowley et al. | |
| 5,754,023 A | 5/1998 | Roston et al. | |
| 5,766,013 A | 6/1998 | Vuyk | |
| 5,767,839 A | 6/1998 | Rosenberg | |
| 5,835,080 A | 11/1998 | Beeteson et al. | |
| 5,880,411 A | 3/1999 | Gillespie et al. | |
| 5,889,236 A | 3/1999 | Gillespie et al. | |
| 5,917,906 A | 6/1999 | Thornton | |
| 5,943,043 A | 8/1999 | Furuhata et al. | |
| 5,977,867 A | 11/1999 | Blouin | |
| 5,982,304 A | 11/1999 | Selker et al. | |
| 6,067,116 A | 5/2000 | Yamano et al. | |
| 6,154,198 A | 11/2000 | Rosenberg | |
| 6,154,201 A | 11/2000 | Levin et al. | |
| 6,160,540 A | 12/2000 | Fishkin et al. | |
| 6,169,540 B1 | 1/2001 | Rosenberg et al. | |
| 6,187,398 B1 | 2/2001 | Eldridge | |
| 6,188,391 B1 | 2/2001 | Seely et al. | |
| 6,218,966 B1 | 4/2001 | Goodwin et al. | |
| 6,243,074 B1 | 6/2001 | Fishkin et al. | |
| 6,243,078 B1 | 6/2001 | Rosenberg | |
| 6,268,857 B1 | 7/2001 | Fishkin et al. | |
| 6,271,828 B1 | 8/2001 | Rosenberg et al. | |
| 6,278,441 B1 | 8/2001 | Gouzman et al. | |
| 6,300,937 B1 | 10/2001 | Rosenberg | |
| 6,310,614 B1 | 10/2001 | Maeda et al. | |
| 6,323,846 B1 | 11/2001 | Westerman et al. | |
| 6,337,678 B1 | 1/2002 | Fish | |
| 6,354,839 B1 | 3/2002 | Schmidt et al. | |
| 6,356,259 B1 | 3/2002 | Maeda et al. | |
| 6,359,572 B1 | 3/2002 | Vale | |
| 6,366,272 B1 | 4/2002 | Rosenberg et al. | |
| 6,369,803 B2 | 4/2002 | Brisebois et al. | |
| 6,384,743 B1 | 5/2002 | Vanderheiden | |
| 6,414,671 B1 | 7/2002 | Gillespie et al. | |
| 6,429,846 B2 | 8/2002 | Rosenberg et al. | |
| 6,437,771 B1 | 8/2002 | Rosenberg et al. | |
| 6,462,294 B2 | 10/2002 | Davidson et al. | |
| 6,469,692 B2 | 10/2002 | Rosenberg | |
| 6,486,872 B2 | 11/2002 | Rosenberg et al. | |
| 6,498,353 B2 | 12/2002 | Nagle et al. | |
| 6,501,462 B1 | 12/2002 | Garner | |
| 6,509,892 B1 | 1/2003 | Cooper et al. | |
| 6,529,183 B1 | 3/2003 | MacLean et al. | |
| 6,573,844 B1 | 6/2003 | Venolia et al. | |
| 6,636,202 B2 | 10/2003 | Ishmael et al. | |
| 6,639,581 B1 | 10/2003 | Moore et al. | |
| 6,655,788 B1 | 12/2003 | Freeman | |
| 6,657,614 B1 | 12/2003 | Ito et al. | |
| 6,667,738 B2 | 12/2003 | Murphy | |
| 6,681,031 B2 | 1/2004 | Cohen et al. | |
| 6,683,627 B1 | 1/2004 | Ullmann et al. | |
| 6,686,911 B1 | 2/2004 | Levin et al. | |
| 6,697,086 B2 | 2/2004 | Rosenberg et al. | |
| 6,700,556 B2 | 3/2004 | Richley et al. | |
| 6,703,924 B2 | 3/2004 | Tecu et al. | |
| 6,743,021 B2 | 6/2004 | Prince et al. | |
| 6,788,295 B1 | 9/2004 | Inkster | |
| 6,819,316 B2 | 11/2004 | Schulz et al. | |
| 6,850,222 B1 | 2/2005 | Rosenberg | |
| 6,861,961 B2 | 3/2005 | Sandbach et al. | |
| 6,877,986 B2 | 4/2005 | Fournier et al. | |
| 6,881,063 B2 | 4/2005 | Yang | |
| 6,930,234 B2 | 8/2005 | Davis | |
| 6,937,225 B1 | 8/2005 | Kehlstadt et al. | |
| 6,975,305 B2 | 12/2005 | Yamashita | |
| 6,979,164 B2 | 12/2005 | Kramer | |
| 6,982,696 B1 | 1/2006 | Shahoian | |
| 6,995,745 B2 | 2/2006 | Boon et al. | |
| 7,027,032 B2 | 4/2006 | Rosenberg et al. | |
| 7,056,051 B2 | 6/2006 | Fiffie | |
| 7,061,467 B2 | 6/2006 | Rosenberg | |
| 7,064,655 B2 | 6/2006 | Murray et al. | |
| 7,079,111 B2 | 7/2006 | Ho | |
| 7,081,888 B2 | 7/2006 | Cok et al. | |
| 7,096,852 B2 | 8/2006 | Gregorio | |
| 7,102,541 B2 | 9/2006 | Rosenberg | |
| 7,104,152 B2 | 9/2006 | Levin et al. | |
| 7,106,305 B2 | 9/2006 | Rosenberg | |
| 7,106,313 B2 | 9/2006 | Schena et al. | |
| 7,109,967 B2 | 9/2006 | Hioki et al. | |
| 7,112,737 B2 | 9/2006 | Ramstein | |
| 7,113,166 B1 | 9/2006 | Rosenberg et al. | |
| 7,116,317 B2 | 10/2006 | Gregorio et al. | |
| 7,124,425 B1 | 10/2006 | Anderson, Jr. et al. | |
| 7,129,854 B2 | 10/2006 | Arneson et al. | |
| 7,131,073 B2 | 10/2006 | Rosenberg et al. | |
| 7,136,045 B2 | 11/2006 | Rosenberg et al. | |
| 7,138,977 B2 | 11/2006 | Kinerk et al. | |
| 7,138,985 B2 | 11/2006 | Nakajima | |
| 7,143,785 B2 | 12/2006 | Maerkl et al. | |
| 7,144,616 B1 | 12/2006 | Unger et al. | |
| 7,148,875 B2 | 12/2006 | Rosenberg et al. | |
| 7,151,432 B2 | 12/2006 | Tierling | |
| 7,151,527 B2 | 12/2006 | Culver | |
| 7,151,528 B2 | 12/2006 | Taylor et al. | |
| 7,154,470 B2 | 12/2006 | Tierling | |
| 7,158,112 B2 | 1/2007 | Rosenberg et al. | |
| 7,159,008 B1 | 1/2007 | Wies et al. | |
| 7,161,276 B2 | 1/2007 | Face | |
| 7,161,580 B2 | 1/2007 | Bailey et al. | |
| 7,168,042 B2 | 1/2007 | Braun et al. | |
| 7,176,903 B2 | 2/2007 | Katsuki et al. | |
| 7,182,691 B1 | 2/2007 | Schena | |
| 7,191,191 B2 | 3/2007 | Peurach et al. | |
| 7,193,607 B2 | 3/2007 | Moore et al. | |
| 7,195,170 B2 | 3/2007 | Matsumoto et al. | |
| 7,196,688 B2 | 3/2007 | Schena | |
| 7,198,137 B2 | 4/2007 | Olien | |
| 7,199,790 B2 | 4/2007 | Rosenberg et al. | |
| 7,202,851 B2 | 4/2007 | Cunningham et al. | |
| 7,205,981 B2 | 4/2007 | Cunningham | |
| 7,208,671 B2 | 4/2007 | Chu | |
| 7,209,028 B2 | 4/2007 | Boronkay et al. | |
| 7,209,113 B2 | 4/2007 | Park | |

(56) References Cited

U.S. PATENT DOCUMENTS

| | | |
|---|---|---|
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynanen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |

(56) References Cited

U.S. PATENT DOCUMENTS

| | | | |
|---|---|---|---|
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 8,970,403 B2 | 3/2015 | Ciesla et al. |
| 9,116,617 B2 | 8/2015 | Ciesla et al. |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1* | 10/2006 | King .................. G06F 1/1626 345/173 |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1* | 7/2009 | Ciesla ................. G06F 3/04886 345/174 |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0256817 A1 | 10/2009 | Perlin et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |

(56) References Cited

U.S. PATENT DOCUMENTS

| | | |
|---|---|---|
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0090814 A1 | 4/2010 | Cybart et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182135 A1 | 7/2010 | Moosavi |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1* | 1/2011 | Ciesla ............... G06F 1/1616 345/173 |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0241442 A1 | 10/2011 | Mittleman et al. |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2011/0306931 A1 | 12/2011 | Kamen et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1* | 4/2012 | Ciesla ............... G06F 3/044 345/174 |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0275888 A1 | 10/2013 | Williamson et al. |
| 2014/0043291 A1 | 2/2014 | Ciesla et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1* | 1/2015 | Cho ............... G06F 3/044 345/168 |
| 2015/0091834 A1* | 4/2015 | Johnson ............... G06F 3/016 345/173 |
| 2015/0205419 A1* | 7/2015 | Calub ............... G06F 3/016 345/173 |
| 2015/0293591 A1 | 10/2015 | Yairi et al. |

FOREIGN PATENT DOCUMENTS

| | | |
|---|---|---|
| CN | 1882460 A | 12/2006 |
| EP | 2000884 A1 | 12/2008 |
| GB | 190403152 A | 12/1904 |
| GB | 108771 A | 8/1917 |
| GB | 1242418 A | 8/1971 |
| JP | 10255106 | 9/1998 |
| JP | H10255106 | 9/1998 |
| JP | 2006268068 A | 10/2006 |
| JP | 2006285785 A | 10/2006 |
| JP | 200964357 A | 3/2009 |
| JP | 2009064357 A | 3/2009 |
| KR | 20000010511 | 2/2000 |
| KR | 100677624 B | 1/2007 |
| KR | 20090023364 | 11/2012 |
| WO | 2004028955 A2 | 4/2004 |
| WO | 2006082020 A1 | 9/2006 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011108382 A1 | 9/2011 |
| WO | 2011112984 A | 9/2011 |
| WO | 2011118382 A1 | 9/2011 |
| WO | 2011133604 A | 10/2011 |
| WO | 2011133605 A | 10/2011 |
| WO | 2013173624 A2 | 11/2013 |
| WO | 2014047656 A2 | 3/2014 |

OTHER PUBLICATIONS

Jeong et al., "Tunable Microdoublet Lens Array," Optical Society of America, Optics Express; vol. 12, No. 11. May 31, 2004, 7 Pages.

Preumont, A. Vibration Control of Active Structures: An Introduction, Jul. 2011.

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

* cited by examiner

DYNAMIC TACTILE INTERFACE

CROSS-REFERENCE TO RELATED APPLICATIONS

This application claims the benefit of U.S. Provisional Application No. 61/907,534, filed 22 Nov. 2013, which is incorporated in its entirety by this reference.

This application is related to U.S. Provisional Application No. 62/045,124, filed 3 Sep. 2014; U.S. patent application Ser. No. 11/969,848, filed on 4 Jan. 2008; U.S. patent application Ser. No. 13/414,589 filed 7 Mar. 2012; U.S. patent application Ser. No. 13/456,010, filed 25 Apr. 2012; U.S. patent application Ser. No. 13/456,031, filed 25 Apr. 2012; U.S. patent application Ser. No. 13/465,737, filed 7 May 2012; and U.S. patent application Ser. No. 13/465,772, filed 7 May 2012, all of which are incorporated in their entireties by this reference.

TECHNICAL FIELD

This invention relates generally to touch-sensitive displays, and more specifically to a new and useful dynamic tactile interface in the field of touch-sensitive displays.

DESCRIPTION OF THE EMBODIMENTS

The following description of the embodiments of the invention is not intended to limit the invention to these embodiments, but rather to enable any person skilled in the art to make and use this invention.

1. Dynamic Tactile Interface

Figure 7:
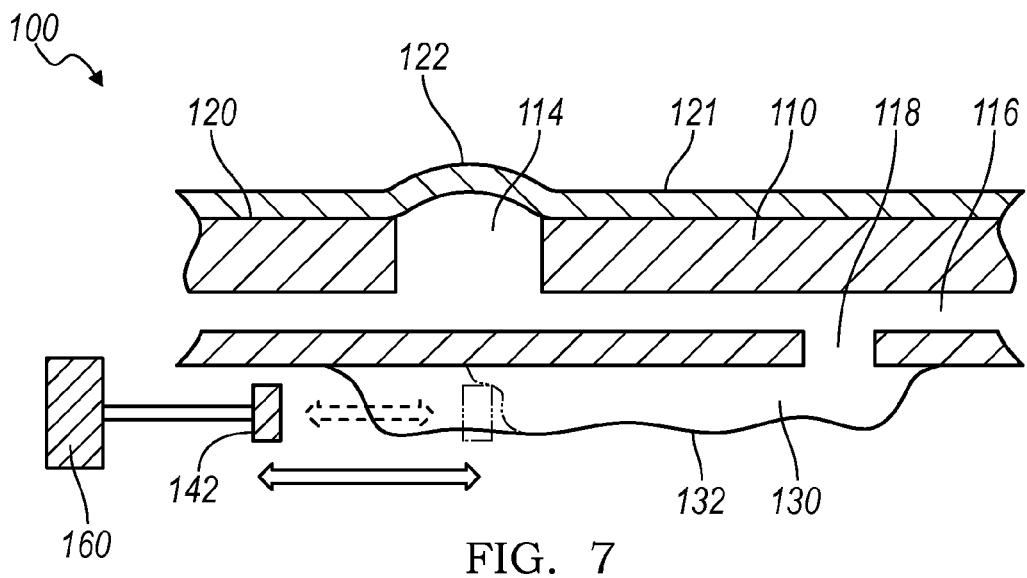
FIG. 7 is a flowchart representation of one variation of the dynamic tactile interface.

As shown in FIG. 7, the dynamic tactile interface 100 includes a tactile layer 120 defining a peripheral region 121 and a deformable region 122 adjacent the peripheral region 121; a substrate 110 coupled to the peripheral region 121 across an attachment surface of the substrate 110, the substrate no defining a back surface opposite the attachment surface, a fluid conduit 114 adjacent the deformable region 122, a fluid channel 116 fluidly coupled to the fluid conduit 114, and a via 118 fluidly coupled to the fluid channel 116 and passing through the back surface; a bladder 130 fluidly coupled to the via 118 and coupled to the back surface of the substrate 110, the bladder 130 defining a longitudinal axis; a volume of fluid arranged within the bladder 130; a structure 143 adjacent a first side of the bladder 130; and a platen 149 adjacent a second side of the bladder 130 opposite the first side and compressing the bladder 130 against the structure 143 in a direction substantially perpendicular the longitudinal axis of the bladder 130 and substantially parallel the back surface of the substrate 110 to displace fluid from the bladder 130, through the via 118, and into the fluid channel 116 to transition the deformable region 122 from a retracted setting into an expanded setting, the deformable region 122 tactilely distinguishable from the peripheral region 121 in the expanded setting.

Figure 11A:
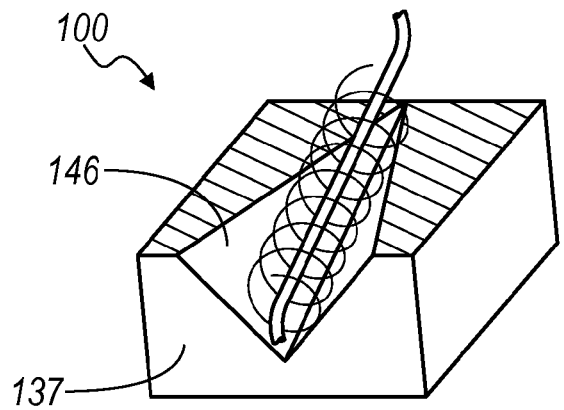
FIGS. 11A, 11B, and 11C are schematic representations of one variation of the dynamic tactile interface.
Figure 11B:
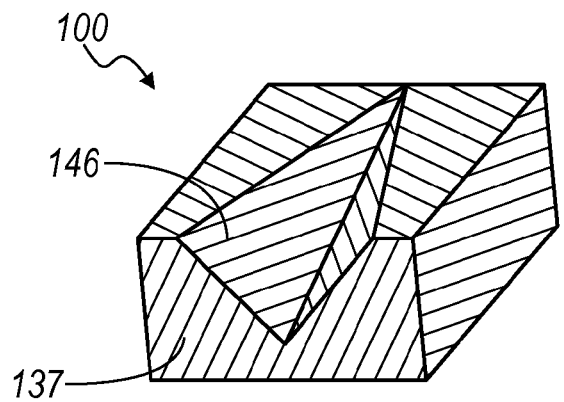
Figure 11C:
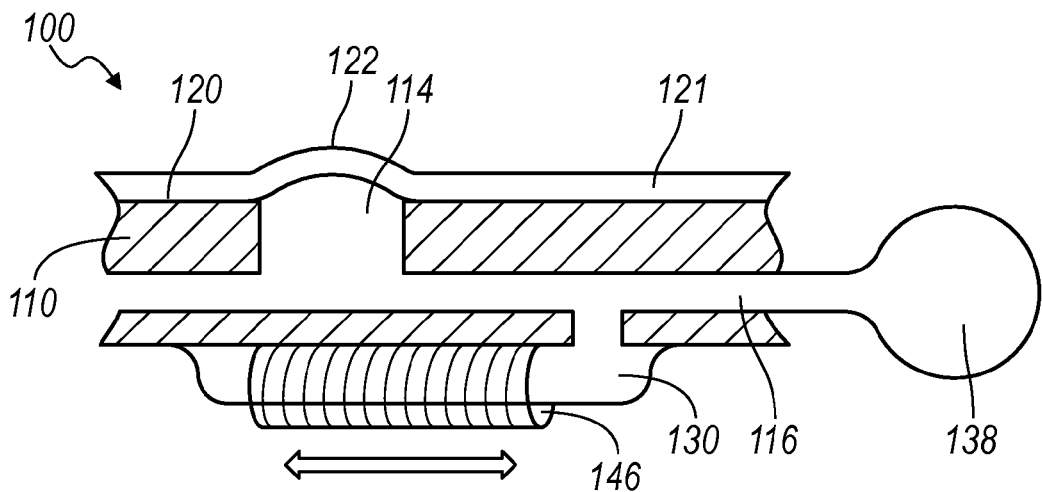

A variation of the dynamic tactile interface 100, shown in FIGS. 11A, 11B, and 11C, includes: a tactile layer 120 defining a peripheral region 121 and a deformable region 122 adjacent the peripheral region 121, the deformable region 122 operable between a retracted setting and an expanded setting, the deformable region 122 defining a formation tactilely distinguishable from the peripheral region 121 in the expanded setting; a substrate 110 coupled to the peripheral region 121 at an attachment surface of the substrate 110, the substrate 110 defining a back surface opposite the attachment surface, a fluid conduit 114 adjacent the deformable region 122, a fluid channel 116 fluidly coupled to the fluid conduit 114, and a via 118 fluidly coupled to the fluid channel 116 and passing through the back surface; a sleeve 147 defining a valley 146 of a first cross-section proximal a first end of the sleeve 147 and of a second cross-section proximal a second end of the sleeve 147, the first cross-section of an area less than an area of the second cross-section, the sleeve 147 operable between a first position and a second position; a bladder 130 fluidly coupled to the via 118, adjacent the back surface of the substrate 110, defining a longitudinal axis, and arranged within the valley 146; a volume of fluid arranged within the bladder iso; and an actuator 160 coupled to the sleeve 147 and translating the sleeve 147 in a direction substantially parallel the longitudinal axis from the first position to the second position to displace fluid from the bladder 130, through the via 118, and into the fluid channel 116 to transition the deformable region 122 from the retracted setting to the expanded setting, the sleeve 147 proximal a first end of the bladder 130 releasing a portion of the bladder 130 in the first position and proximal a second end of the bladder 130 and constricting the portion of the bladder 130 in the second position.

Generally, the dynamic tactile interface 100 includes a substrate 110, a tactile layer 120, a bladder 130, and a displacement device 140 configured to displace fluid from the bladder 130. One variation of the displacement device 140 includes the structure 143 and the platen 149, the platen 149 cooperating with the structure 143 to compress the bladder 130 and displace fluid from the bladder 130 into the fluid channel 116. Another variation of the displacement device 140 includes a sleeve 147 defining a valley 146 of varying cross-section translating linearly along the longitudinal axis of the bladder 130, the bladder 130 arranged in the valley 146 of the sleeve 147 and compressed between surfaces of the valley 146 to displace fluid from the bladder 130 into the fluid channel 116. A variation of the dynamic tactile interface 100 further includes a cavity 144 configured to receive an instrument 141, the bladder 130 coupled to the cavity 144. In this variation, the displacement device 140 is defined by the instrument 141 and the cavity 144, the instrument 141 compressing the bladder 130 to displace fluid from the bladder 130 to the fluid channel 116.

2. Applications

The dynamic tactile interface 100 can define a deformable region 122, which can selectively expand and retract to provide intermittent tactile guidance at the tactile layer 120, such as for a user interacting with a computing device incorporating the dynamic tactile interface 100. The dynamic tactile interface 100 can be applied as dynamic surface for an electronic device receiving tactile inputs. In particular, the dynamic tactile interface 100 can be applied to (e.g., applied over or integrated in) an electronic device incorporating a touchscreen, such as a tablet, smartphone, laptop computer, desktop computer, personal data assistant (PDA), personal music player (e.g., MP3 player), an automotive dashboard display or console, stereo interface, a television, or a personal navigation device. The dynamic tactile interface 100 can also be applied to a watch, a home stereo system interface, a lighting or thermostat control system, a machine tool controller, a computer mouse, a computer touchpad, a keyboard or keypad, a gaming controller or console, cooking equipment, or any other suitable electronic and/or digital computing device. The dynamic tactile interface 100 can be arranged (e.g., transiently installed) over a touchscreen to enable tactile guidance for a user interacting with the touchscreen. For example, the dynamic tactile interface 100 can be integrated into or applied over a touchscreen of a computing device to selectively and intermittently represent physical hard keys (e.g., round or rectangular buttons) substantially aligned with input keys rendered on an adjacent (digital) display 180. In one implementation, the deformable region 122 can be planar or flush with the peripheral region 121 in the retracted setting and the deformable region 122 can be raised above the peripheral region 121 in the expanded setting to define a tactilely distinguishable feature on the tactile surface. For example, a user can manually actuate the displacement device 140 to transition the deformable region 122 to the expanded setting in order to guide the user to apply an input, such as with a finger or stylus 141, to a particular region of the tactile layer 120 corresponding to (i.e., arranged over) a key of a virtual keyboard rendered by the display 180. In this example, the displacement device 140 can transition the deformable region 122 to the retracted setting when the user actuates the displacement device 140, deforming the tactile layer 120 to a substantially planar or flush configuration. In particular, the displacement device 140 (i.e., the platen 149 or the sleeve 147), which can be manually or electromechanically actuated, can compress the bladder 130 to displace fluid out of the bladder 130, thereby transitioning the deformable region 122 into the expanded setting. For example, the displacement device 140 can include the platen 149 arranged adjacent a first side of the bladder 130 and a structure 143 arranged adjacent a second side of the bladder 130 opposite the first side, the displacement device 140 translating the platen 149 toward the structure 143 to compress the bladder 130 and displace fluid from the bladder 130. The displacement device 140 can also actively manipulate or passively release the bladder 130 to displace fluid or release fluid back into the bladder 130 to transition the deformable region 122 back into the retracted setting.

Generally, the displacement device 140 of the dynamic tactile interface 100 can displace fluid into and out of the fluid channel 116 to transition the deformable region 122 of the dynamic tactile interface 100 between retracted and expanded settings. In one implementation, the deformable region 122 can be substantially flush with the adjacent peripheral region 121 in the retracted setting, such that the surface geometry is substantially continuous (e.g., flat, planar, smooth) across the deformable region 122 and the peripheral region 121 in the retracted setting. In this implementation, fluid displaced into the fluid channel 116 can expand the deformable region 122, thereby elevating the deformable region 122 above the peripheral region 121 in the expanded setting. In another implementation, the deformable region 122 can be substantially flush with the adjacent peripheral region 121 in the expanded setting and offset below the peripheral region 121 in the retracted setting. The dynamic tactile interface 100 can set vertical positions (e.g., heights above the peripheral region 121) of one or more deformable regions 122 of the tactile layer 120 to provide distinct tactilely distinguishable features (i.e., buttons) of various heights across the tactile surface.

In one example application, the bladder 130 can be arranged within the valley 146 of the sleeve 147 such that when the sleeve 147 translates along the longitudinal axis of the bladder 130, the walls of the bladder 130 conform to varying cross-section of valley 146 and the valley 146 constricts the bladder 130 to displace fluid from the bladder 130 into the fluid channel 116. In this example application, the sleeve 147 can be manually actuated by the user, such as through an actuator 160 (e.g., a lever) coupled to the sleeve 147, the actuator 160 translating the sleeve 147 along the longitudinal axis of the bladder 130. In this example application, the actuator 160 can be translationally coupled to a housing 150 surrounding a computing device with an integrated display 180 and arranging the substrate 110 and tactile layer 120 over the integrated display 180. In a similar example application, the displacement device 140 (e.g., the platen 149) can communicate a force or torque applied by a user to the actuator 160 (e.g., a button, a lever, a switch) to translate the platen 149 toward the structure 143 and compress the bladder 130 between the platen 149 and the structure 143. Additionally, the displacement device 140 can, therefore, selectively and intermittently compress one or more bladders 130 to selectively and intermittently deform of one or more deformable regions 122 between the retracted setting and the expanded setting to provide tactile (e.g., haptic) guidance to a user interacting with a connected computing device, such as a smartphone or tablet. The displacement device 140 can translate, rotate, or otherwise move parallel the back surface and, thus, compress the bladder 130 in a direction parallel the back surface, thereby limiting force applied perpendicular to the back surface of the substrate 110, which can cause the substrate 110 to lift away from a computing device over which the dynamic tactile layer 120 can be arranged.

3. Tactile Layer

Figure 14:
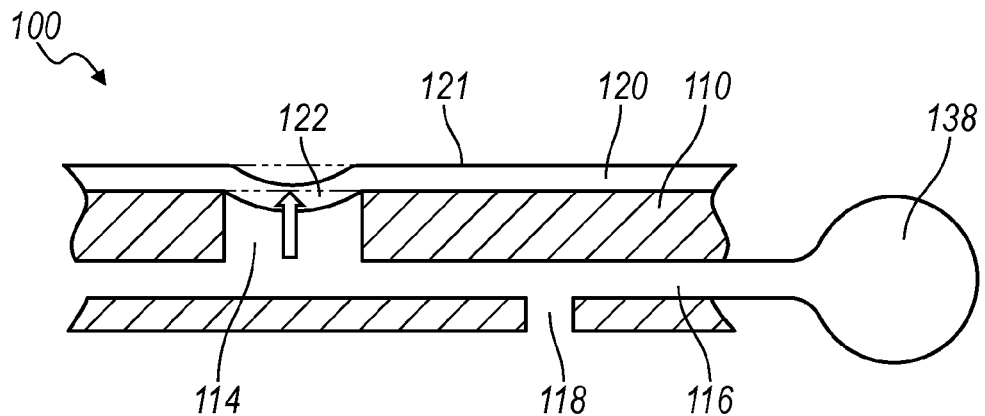
FIG. 14 is a schematic representation of one variation of the dynamic tactile interface.

The dynamic tactile interface 100 includes a tactile layer 120 defining a peripheral region 121 and a deformable region 122 adjacent the peripheral region 121. Generally, the tactile layer 120 functions to define the tactile surface, the deformable region 122 and the peripheral region 121. The tactile surface defines an interaction surface through which a user can provide an input to an electronic device that incorporates (e.g., integrates) the dynamic tactile interface 100. The deformable region 122 defines a dynamic region of the tactile layer 120, which can expand to define a tactilely distinguishable formation on the tactile surface in order to, for example, guide a user input to an input region of the electronic device. The peripheral region 121 attaches to the substrate 110 and defines a perimeter of the deformable region 122. Thus, the peripheral region 121 cooperates with the deformable region 122 to define a configuration of the tactile layer 120 and, in particular, a shape of the tactile layer 120 when the deformable region 122 is in the expanded setting. Alternatively, the deformable region can transition from offset below and tactilely distinguishable from the peripheral region in the retracted setting to substantially flush with the peripheral region in the expanded setting, as shown in FIG. 14.

The tactile layer 120 can be transparent, translucent, or of any other optical clarity suitable for transmitting light emitted by a display 180 across the tactile layer 120. Thus, the tactile layer 120 can function as a dynamic tactile interface 100 for the purpose of guiding, with the deformable region 122, an input to a region of the display 180 corresponding to a rendered image. For example, the deformable regions 122 can function as a transient physical keys corresponding to discrete virtual keys of a virtual keyboard rendered on a display 180 coupled to the dynamic tactile interface 100. Alternatively, the tactile layer 120 can be substantially opaque or semi-opaque, such as in an implementation in which the tactile layer 120 is applied over a computing device without a display 180. In this implementation, an opaque tactile layer 120 can yield a dynamic tactile interface 100 for receiving inputs on, for example, a touch sensitive surface of a computing device. The tactile layer 120 can also exhibit anti-reflective properties. For example, the tactile layer 120 can include multiple interference layers stacked in such a way to induce a gradual refractive index gradient across the tactile layer 120. The multiple interference layers can be bonded or otherwise adhered, such that the layers can deform (and stretch) at the deformable region 122.

The tactile layer 120 can be elastic (or flexible, malleable, and/or extensible) such that the tactile layer 120 can transition between the expanded setting and the retracted setting at the deformable region 122. As the peripheral region 121 can be attached to the substrate 110, the peripheral region 121 can substantially maintain a configuration (e.g., a planar configuration) as the deformable region 122 transitions between the expanded and retracted settings. Alternatively, the tactile layer 120 can include both an elastic portion and a substantially inelastic (e.g., rigid) portion. The elastic portion can define the deformable region 122; the inelastic portion can define the peripheral region 121. Thus, the elastic portion can transition between the expanded and retracted setting and the inelastic portion can maintain a configuration as the deformable region 122 transitions between the expanded and retracted settings. The tactile layer 120 can be of one or more layers of PMMA (e.g., acrylic), silicone, polyurethane elastomer, urethane, PETG, polycarbonate, or PVC. Alternatively, the tactile layer 120 can be of one or more layers of any other material suitable to transition between the expanded and retracted settings at the deformable region 122.

Alternatively the tactile layer 120 can include one or more sublayers of similar or dissimilar materials. For example, the tactile layer 120 can include a silicone elastomer sublayer adjacent the substrate no and a polycarbonate sublayer joined to the silicone elastomer sublayer and defining the tactile surface. Optical properties of the tactile layer 120 can be modified by impregnating, extruding, molding, or otherwise incorporating particulate (e.g., metal oxide nanoparticles) into the layer and/or one or more sublayers of the tactile layer 120.

Figure 1A:
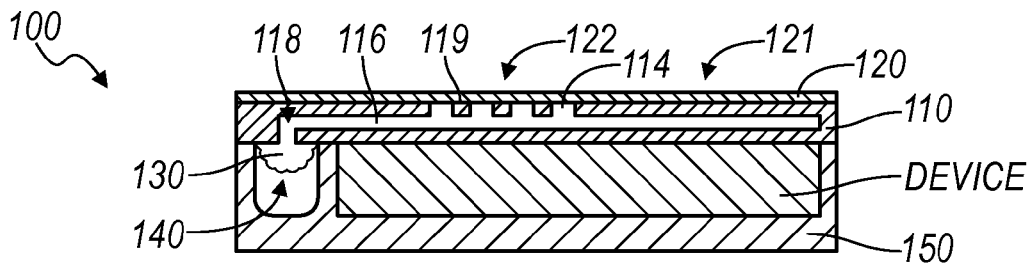
FIGS. 1A and 1B are schematic representations of a dynamic tactile interface.
Figure 1B:
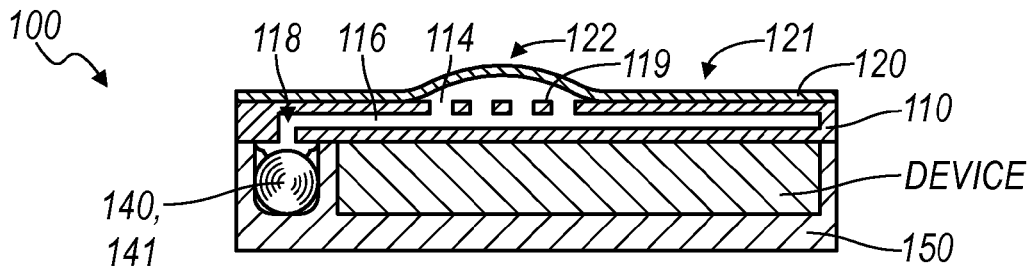

As described in U.S. application Ser. No. 14/035,851, which is herein incorporated in its entirety by this reference, the tactile layer 120 is coupled (e.g. attached or adhered) to the substrate 110 at the peripheral region 121 and cooperates with the substrate 110 to define the fluid conduit 114 adjacent the deformable region 122. Thus, fluid displaced through the fluid channel 116 into the fluid conduit 114 can deform the deformable region 122 of the tactile layer 120 outwardly, thereby transitioning the deformable region 122 from the retracted setting into the expanded setting. The deformable region 122 can be substantially flush with the peripheral region 121 in the retracted setting and can be offset above and tactilely distinguishable from the peripheral region 121 in the expanded setting. In the expanded setting, the deformable region 122 defines a tactilely distinguishable formation defined by the deformable region 122 in the expanded setting can be dome-shaped, ridge-shaped, ring-shaped, crescent-shaped, or of any other suitable form or geometry. When fluid is (actively or passively) released from behind the deformable region 122 of the tactile layer 120, the deformable region 122 can transition back into the retracted setting (shown in FIG. 1A). Alternatively, the deformable region 122 can transition between a depressed setting and a flush setting, the deformable region 122 in the depressed setting offset below flush with the peripheral region 121 and deformed within the fluid conduit 114, the deformable region 122 in the flush setting substantially flush with the deformable region 122. Additionally, the deformable regions 122 can transition between elevated positions of various heights relative to the peripheral region 121 to selectively and intermittently provide tactile guidance at the tactile surface over a touchscreen (or over any other surface), such as described in U.S. patent application Ser. No. 11/969,848, U.S. patent application Ser. No. 13/414, 589, U.S. patent application Ser. No. 13/456,010, U.S. patent application Ser. No. 13/456,031, U.S. patent application Ser. No. 13/465,737, and/or U.S. patent application Ser. No. 13/465,772. The deformable region 122 can also define any other vertical position relative to the peripheral region 121 in the expanded and retracted settings.

However, the tactile layer 120 can be of any other suitable material and can function in any other way to yield a tactilely distinguishable formation at the tactile surface.

4. Substrate

The dynamic tactile interface 100 includes a substrate 110 coupled to the peripheral region 121 across an attachment surface of the substrate 110, the substrate 110 defining a back surface opposite the attachment surface, a fluid conduit 114 adjacent the deformable region 122, a fluid channel 116 fluidly coupled to the fluid conduit 114, and a via 118 fluidly coupled to the fluid channel 116 and passing through the back surface. Generally, the substrate 110 functions to support the tactile layer 120, retain the peripheral region 121, cooperate with the deformable region 122 to define a fluid conduit 114, and define a fluid channel 116 through which fluid travels toward and away from the deformable region 122 of the tactile layer 120 to expand and retract the deformable region 122. Alternatively, the substrate 110 and the tactile layer 120 can be supported by a touchscreen once installed on a computing device. For example the substrate 110 can be of a similar material as and/or similarly or relatively less rigid than the tactile layer 120, and the substrate 110 and the tactile layer 120 can derive support from an adjacent touchscreen of a computing device.

The substrate no can be substantially transparent or translucent. For example, in one implementation, wherein the dynamic tactile interface 100 includes or is coupled to a display 180, the substrate no can be substantially transparent and transmit light output from an adjacent display 180. The substrate no can be PMMA, acrylic, and/or of any other suitable transparent or translucent material. The substrate 110 can alternatively be surface-treated or chemically-altered PMMA, glass, chemically-strengthened alkali-aluminosilicate glass, polycarbonate, acrylic, polyvinyl chloride (PVC), glycol-modified polyethylene terephthalate (PETG), polyurethane, a silicone-based elastomer, or any other suitable translucent or transparent material or combination thereof. Alternatively, the substrate no can be substantially opaque or otherwise substantially non-transparent or translucent. For example, the substrate no can be opaque and arranged over an off-screen region of a mobile computing device. Additionally, the substrate no can include one or more transparent or translucent materials. For example, the substrate no can include a glass base sublayer bonded to walls or boundaries of the fluid channel 116 and the fluid conduit 114. The substrate no can also include a deposited layer of material exhibiting adhesion properties (e.g., an adhesive tie layer or film of silicon oxide film). The deposited layer can be distributed across an attachment surface of the substrate no to which the tactile adheres and function to retain contact between the peripheral region 121 of the tactile layer 120 and the attachment surface of the substrate 110 despite fluid pressure raising above the peripheral region 121 the deformable region 122 and, thus, attempting to pull the tactile layer 120 away from the substrate 110. Additionally, the substrate 110 can be substantially relatively rigid, relatively elastic, or exhibit any other material rigidity property. However, the substrate 110 can be formed in any other way, be of any other material, and exhibit any other property suitable to support the tactile layer 120 and define the fluid conduit 114 and fluid channel 116. Likewise, the substrate (and the tactile layer) can include a substantially transparent (or translucent) portion and a substantially opaque portion. For example, the substrate can include a substantially transparent portion arranged over a display and a substantially opaque portion adjacent the display and arranged about a periphery of the display.

The substrate 110 can define the attachment surface, which functions to retain (e.g., hold, bond, and/or maintain the position of) the peripheral region 121 of the tactile layer 120. In one implementation, the substrate 110 is planar across the attachment surface such that the substrate 110 retains the peripheral region 121 of the tactile layer 120 in planar form, such as described in U.S. patent application Ser. No. 12/652, 708. However, the attachment surface of the substrate 110 can be of any other geometry and retain the tactile layer 120 in any other suitable form. In the retracted setting, the deformable region 122 can be flush with the peripheral region 121. For example, the substrate 110 can define a substantially planar surface across an attachment surface and a support member 119 that faces the tactile layer 120, the attachment surface retaining the peripheral region 121 of the tactile layer 120, and the support member 119 adjacent and substantially continuous with the attachment surface. The support member 119 can be configured to support the deformable region 122 against substantial inward deformation into the fluid conduit 114 (e.g., due to an input applied to the tactile surface at the deformable region 122), such as in response to an input or other force applied to the tactile surface at the deformable region 122. In this example, the substrate 110 can define the fluid conduit 114, which passes through the support member 119, and the attachment surface can retain the peripheral region 121 in substantially planar form. The deformable region 122 can rest on and/or be supported in planar form against the support member 119 in the retracted setting, and the deformable region 122 can be elevated off of the support member 119 in the expanded setting. The support member 119 can, thus, support the deformable region 122 of the tactile layer 120 against inward deformation past the plane of the attachment surface. In another implementation, the support member 119 can define the fluid conduit 114, such that the fluid conduit 114 communicates fluid from the fluid channel 116 through the support member 119 and toward the deformable region 122 to transition the deformable region 122 from the retracted setting to the expanded setting.

Figure 8:
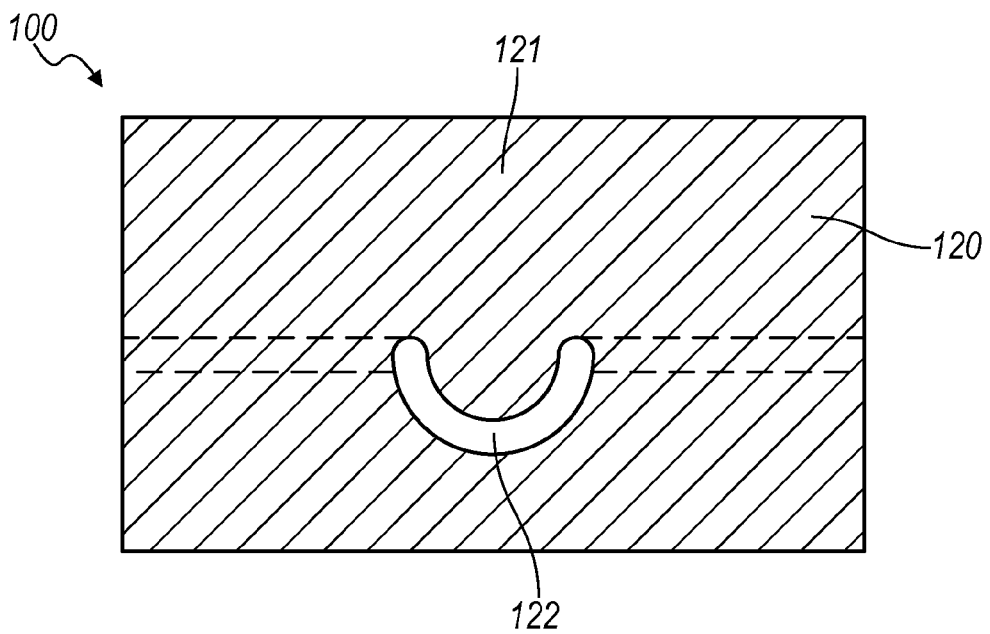
FIG. 8 is a schematic representation of one variation of the dynamic tactile interface.

The substrate no can define (or cooperate with the tactile layer 120, a display 180, etc. to define) the fluid conduit 114 that communicates fluid from the fluid channel 116 to the deformable region 122 of the tactile layer 120. The fluid conduit 114 can substantially correspond to (e.g., lie adjacent) the deformable region 122 of the tactile layer 120. The fluid conduit 114 can be machined, molded, stamped, etched, etc. into or through the substrate no and can be fluidly coupled to the fluid channel 116, the displacement device 140, and the deformable region 122. A bore intersecting the fluid channel 116 can define the fluid conduit 114 such that fluid can be communicated from the fluid channel 116 toward the fluid conduit 114, thereby transitioning the deformable region 122 from the expanded setting to retracted setting. The axis of the fluid conduit 114 can be normal a surface of the substrate 110, can be non-perpendicular with the surface of the substrate 110, of non-uniform cross-section, and/or of any other shape or geometry. For example, as shown in FIG. 8, the fluid conduit 114 can define a crescent-shaped cross-section. In this example, the deformable region 122 can be coupled to (e.g., be bonded to) the substrate 110 along the periphery of the fluid conduit 114. Thus, the deformable region 122 can define a crescent-shape offset above the peripheral region 121 in the expanded setting.

The substrate 110 can define (or cooperate with the sensor, a display 180, etc. to define) the fluid channel 116 that communicates fluid through or across the substrate 110 to the fluid conduit 114. For example, the fluid channel 116 can be machined or stamped into the back of the substrate 110 opposite the attachment surface, such as in the form of an open trench or a set of parallel open trenches. The open trenches can then be closed with a substrate 110 backing layer, the sensor, and/or a display 180 to form the fluid channel 116. A bore intersecting the open trench and passing through the attachment surface can define the fluid conduit 114, such that fluid can be communicated from the fluid channel 116 to the fluid conduit 114 (and toward the tactile layer 120) to transition the deformable region 122 (adjacent the fluid conduit 114) between the expanded and retracted settings. The axis of the fluid conduit 114 can be normal the attachment surface, can be non-perpendicular with the attachment surface, of non-uniform cross-section, and/or of any other shape or geometry. Likewise, the fluid channel 116 be parallel the attachment surface, normal the attachment surface, non-perpendicular with the attachment surface, of non-uniform cross-section, and/or of any other shape or geometry. However, the fluid channel 116 and the fluid conduit 114 can be formed in any other suitable way and be of any other geometry.

In one implementation, the substrate 110 can define a set of fluid channels 116. Each fluid channel 116 in the set of fluid channels 116 can be fluidly coupled to a fluid conduit 114 in a set of fluid conduits 114. Thus, each fluid channel 116 can correspond to a particular fluid conduit 114 and, thus, a particular deformable region 122. Alternatively, the substrate 110 can define the fluid channel 116, such that the fluid channel 116 can be fluidly coupled to each fluid conduit 114 in the set of fluid conduits 114, each fluid conduit 114 fluidly coupled serially along the length of the fluid channel 116. Thus, each fluid channel 116 can correspond to a particular set of fluid conduits 114 and, thus, deformable regions 122.

The substrate 110 can define the via 118 through the back surface of the substrate 110 to communicate fluid from the bladder 130, through or across the back surface of the substrate 110, and to the fluid channel 116. In one example, the via 118 can be machined, stamped, or punching into the substrate 110 backing layer, which, in the foregoing implementation, close the open trench(es) machined in the substrate 110 to define the fluid channel(s) 116. Furthermore, the via 118 can include a valve (e.g., a butterfly valve) or pump to selectively communicate fluid from the bladder 130, through the via 118, into the fluid channel 116. Likewise, the via 118 can be normal the attachment surface, non-perpendicular with the attachment surface, of non-uniform cross-section, and/or of any other shape or geometry. However, the fluid channel 116 and the fluid conduit 114 can be formed in any other suitable way and be of any other geometry The substrate 110 can include a center region and a border area, the center region configured for arrangement over a computing device and defining the fluid conduit 114, the border area configured to overhang a periphery of the computing device and defining the via 118 passing through the back surface of the substrate 110, the substrate 110 defining the fluid channel 116 coupled to the via 118 and to the fluid conduit 114. The center region is configured to overlay across a surface of a computing device. For example, the center region can define an area that spans a front face of the computing device (e.g., a touchscreen), the perimeter of the center region coincident with a perimeter of the front face of the computing device. The substrate 110 can be retained across the exterior surface of the computing device mechanically, such as with a case that encompasses a perimeter of the device. Alternatively, the substrate 110 can include an elastomer and/or adhesive material that bonds to an exterior surface of the computing device. In one example, a self-wetting adhesive is applied over the back surface of the substrate 110 (opposite the tactile layer 120) to mate and retain the substrate 110 against the surface of the computing device. In this implementation, the self-wetting adhesive can also limit air bubbles, excess reflection or light, etc., and/or maintain substantially high light transmission from a touchscreen of the computing device and into the substrate 110, thereby yielding suitable optical clarity at the junction between the substrate 110 and the touchscreen. The substrate 110 can also be removable from the surface and the dynamic tactile interface 100 can also be reusable. The deformable region 122 of the tactile layer 120 coincident the center region of the substrate 110 can transiently (i.e., intermittently) provide tactile guidance over the surface (e.g., a touchscreen) of the computing device in the expanded setting with minimal optical distortion of the surface across (i.e., through) the deformable region 122, the peripheral region 121, the fluid channel 116, and the fluid conduit 114 throughout the center region in the retracted setting. For example, the substrate 110, the tactile layer 120, and fluid within the closed fluid system can be of substantially similar indices of refraction, and the tactile layer 120 and the substrate 110 can be of substantially uniform thickness across the center region in the retracted setting, as described in U.S. Patent Application No. 61/841,176.

The border area of the substrate 110 can extend off an edge of the computing device to support the bladder 130 off the side of and adjacent to the computing device. The substrate 110 can support the tactile layer 120 adjacent the attachment surface and the bladder 130 coupled to the back surface of the substrate 110 in order to form a singular structure 143 defining a closed fluid system. The substrate 110 can support the bladder 130 remote from a display 180 of the computing device (i.e., off of the center region and coincident the border region) to limit optical obstruction of the display 180 by the bladder 130 and the displacement device 140 obstruct the surface. The bladder 130 can be arranged adjacent the display 180 and below the tactile surface to contain of the bladder 130 inside a hard case or housing 150 with the displacement device 140. The substrate 110 can also define a bezel proximal a periphery of the substrate 110 (i.e., coincident the border region); wherein the substrate 110 defines a center region between the bezel, arranged over a display 180, and coincident the deformable region 122, the bezel supporting the bladder 130 and adjacent the display 180.

5. Bladder and Volume of Fluid

The dynamic tactile interface 100 includes a bladder 130 fluidly coupled to the via 118 and coupled to the back surface of the substrate no, the bladder 130 defining a longitudinal axis and a volume of fluid arranged within the bladder 130. Generally, the bladder 130 functions to support fluid (and, thus, the volume of fluid) and communicate fluid to the via 118 in order to expand and retract the deformable region 122.

The bladder 130 is fluidly coupled to the via 118, such as through a port 112, a valve, a spout, a sieve, etc., such that the bladder 130 can provide fluid to communicate through the via 118 to transition the deformable region 122. The bladder 130 can include a membrane 132 substantially containing and surrounding fluid and an opening coincident the via 118. The membrane 132 can be substantially rigid, such that the membrane 132 preserves an initial shape of the bladder 130 under an applied force, such as compression by the platen 149 or sleeve 147. The membrane 132 can also be stiff but pliant under a particular applied load (i.e., force). Furthermore, the membrane 132 can function as a spring and, thus, deform from a natural configuration to a deformed configuration under the particular applied load and return to (e.g., snap back to) the natural configuration when the particular applied load is removed. For example, the membrane 132 can include a silicone sheet defining a square cross-section tube (i.e., the bladder 130) with a natural tendency to maintain the square cross-section. Under the particular applied load, the silicone membrane 132 can buckle to conform to the particular applied load. When the particular applied load is removed from the silicone membrane 132, the silicone membrane 132 can restore (e.g., spring back to) the square cross-section (and substantially without the aid of fluid pressure). Alternatively, the membrane 132 can be substantially pliant. Thus, the membrane 132 can be of an elastomeric material, such as urethane, defining walls of the bladder 130 that can deform (e.g., flex or conform) under the particular applied load to the bladder 130.

In one implementation, the tactile layer 120 can include a material of a first modulus of elasticity, the substrate no can include a material of a second modulus of elasticity greater the first modulus of elasticity, and the bladder 130 can include a membrane 132 of a third modulus of elasticity greater than the first modulus of elasticity and lower than the second modulus of elasticity. Thus, when the displacement device 140 compresses a portion of the bladder 130, the deformable region 122 stretches from the retracted setting to the expanded setting more readily than the bladder 130 expands. In this implementation, a force applied to actuate the displacement can be transformed to displace fluid from the bladder 130 and expand the deformable region 122 with minimal energy losses due to expansion of the bladder 130.

The bladder 130 can be of any shape and cross-section suitable to support fluid within the bladder 130 and communicate fluid to the via 118. For example, the bladder 130 can have a circular, rectangular, ovular, teardrop, parabolic, polygonal, dovetail, or any other cross-section. The bladder 130 can define the longitudinal axis of the bladder 130 such that a length dimension of the bladder 130 is longer than a width dimension of the bladder 130. For example, the bladder 130 can include a cylinder of a length of three centimeters and an outer diameter of five millimeters. Alternatively, in another example, the bladder 130 can be formed by an elastomeric membrane 132 adhered along a periphery of the sheet to the back surface of the substrate no, such that the bladder 130 supports fluid between the elastomeric membrane 132 and the back surface of the substrate 110. In this example, a portion of the bladder 130 can be arranged coincident the via 118 such that fluid can pass from the bladder 130 through the via 118. The longitudinal axis of the bladder 130 can be substantially linear. Alternatively, the longitudinal axis of the bladder 130 can be substantially non-linear (and coincident the center of the cross-section of the bladder 130). For example, the membrane 132 can define a hollow ring torus (or a toroidal polyhedron, etc.) bladder 130 supporting fluid within the hollow of the ring torus bladder 130.

In one example, the membrane 132 can include a urethane sheet rolled into a cylindrical tube. A first end of the tube can be closed (e.g., with a plug or a seal) such that the first end of the tube prevents fluid flow through the first end. A second end of the tube opposite the first end can be arranged coincident the via 118, such that fluid can communicate through the second end of the bladder 130 into the via 118.

The bladder 130 can be coupled to the border area of the substrate 110, such that the bladder 130 lies over or adjacent the via 118 and opposite the tactile layer 120. In one implementation, the bladder 130 can be formed by a molded elastomer bonded to the interior surface of the substrate 110. As the displacement device 140 acts on the bladder 130, the wall(s) of the bladder 130 can elastically deform as the internal volume of the bladder 130 decreases, thereby displacing fluid out of the bladder 130 and through the via 118 to expand the deformable region 122. Once the displacement device 140 releases the bladder 130, the bladder 130 can return to the natural form of the bladder 130, thus drawing fluid back out of the fluid channel 116 through the via 118 to retract the deformable region 122. The bladder 130 can couple to the fluid channel 116, the fluid conduit 114, and the deformable region 122 through the via 118 to define a closed fluid system.

In another implementation, the bladder 130 can be arranged or coupled to the back surface of the substrate no, such that the longitudinal axis of the bladder 130 can parallel a plane of the back surface of the substrate no. For example, the dynamic tactile interface 100 can further include a first block 142 coupled to and extending from the back surface of the substrate no and a second block 142 coupled to and extending from the back surface of the substrate no, the second block 142 laterally offset from the first block 142. In this example, the bladder 130 can define an elongated cylindrical tube, which suspends between the first block 142 and the second block 142, an outer surface of the bladder 130 offset from the back surface. A first end of the bladder 130 couples to the first block 142, a second end of the bladder 130 opposite the first end of the bladder 130 couples to the second block 142, the longitudinal axis of the bladder 130 substantially parallel the back surface. The second block 142 defines a port 112 fluidly coupled to the via 118. The first end of the bladder 130 can be closed, the second end fluidly couples to the port 112 to communicate fluid from the bladder 130, through the port 112, and to the via 118.

In one implementation, the substrate no can include a continuous planar sublayer of a substantially transparent and relatively rigid material, such as acrylic (e.g., PMMA) or polycarbonate (PC). In this implementation, the substrate no defines a through-bore (i.e., the fluid conduit 114) in the center region and an open channel across a back surface of the substrate no, the open channel extending from the border area of the substrate no into the center region of the substrate no, the through-bore communicating fluid from the open channel into a fluid conduit 114 between the tactile layer 120 and the substrate 110. In this implementation, the bladder 130 includes an elastomer sheet defining a trough 134 and bonded to the back surface of the substrate no over the via 118. The trough 134 can be molded (e.g., vacuum molded) into the elastomeric sheet. The elastomeric sheet can then be bonded to the back surface of the substrate no with the trough 134 coincident with the end of the open channel in the border area the elastomeric sheet, thereby closing the open channel to define the fluid channel 116. Thus, the trough 134 cooperates with the back surface to define the bladder 130 and the end of the fluid channel 116 at the bladder 130 defining the via 118. Furthermore, in this implementation, the tactile layer 120 can include a similar elastomeric sheet selectively bonded to the attachment surface of the substrate no at the peripheral region 121(s), the deformable region 122 arranged over the fluid conduit 114 (i.e., the through bore) such that compression of the bladder 130 displaces fluid through the via 118, into the fluid channel 116, and through the fluid conduit 114 toward the deformable region 122 to transition the deformable region 122 into the expanded setting. For example, the substrate no and the tactile layer 120 can be formed, include materials, and be assembled as described in U.S. patent application Ser. No. 14/035,851, which is incorporated in its entirety by this reference. Thus, in this implementation, the bladder 130 can hang below the substrate no from a surface opposite the tactile layer 120 such that compression of the bladder 130 toward the substrate no displaces fluid into the fluid channel 116 to expand the deformable region 122.

In another implementation, the trough 134 can be molded (e.g., vacuum molded) into the elastomeric sheet bonded to the back surface of the substrate to form a substantially self-enclosed cross-section. The trough 134 and the substrate, thus, can cooperate to define the bladder 130. The external portion of the trough 134 can be bonded to the back surface of the substrate no. The trough 134 can further be coincident with the end of the open channel in the border area the elastomeric sheet thereby closing the open channel to define the fluid channel 116, and the end of the fluid channel 116 at the bladder 130 defining the via 118. Therefore, the self-enclosed cross-section of the trough 134 prevents substantial force applied directly to the substrate no and, therefore, prevents substantial lifting of the tactile layer 120 away from the substrate 110.

In a similar implementation, the substrate no includes a continuous planar substrate 110 of a transparent and relatively rigid material, defining a through-bore in the center region, an open channel across the back surface of the substrate no, and a via 118 passing through border area at the end of the open channel, the open channel extending from the border area of the substrate 110 into the center region of the substrate no. In this implementation, a uniform-thickness elastomeric sheet can be bonded to the back surface of the substrate no to close the open channel to define the fluid channel 116, thereby completing the substrate no. The tactile layer 120 can define a similar elastomeric layer, and a trough 134 can be molded (e.g., vacuum molded) into the tactile layer 120. A region of the tactile layer 120 around the trough 134 can then be bonded across the outer surface of the substrate 110 at the border area with the trough 134 coincident with the via 118 in the border area and the peripheral region 121 of the tactile layer 120 can be similarly bonded to the outer surface of the substrate no across the center region, the deformable region 122 arranged over the fluid conduit 114. The substrate 110 can thus cooperate with the trough 134 in the tactile layer 120 to form the bladder 130. Finally, a bend can then be formed along a (linear) perimeter between border area and the active of the substrate-tactile layer stack. For example, the bend can define a ninety-degree included angle such that compression of the bladder 130 perpendicular to the tactile surface displaces fluid through the via 118, into the fluid channel 116, and through the fluid conduit 114 toward the deformable region 122 to transition the deformable region 122 into the expanded setting. Thus in this implementation, the bladder 130 can hang below and outside of the substrate 110 that lateral compression of the bladder 130 perpendicular to the tactile surface displaces fluid into the fluid channel 116 to expand the deformable region 122.

In a similar implementation, the bladder 130 can be defined by an elastomeric membrane 132 coupled to the open channel, the elastomeric membrane 132 forming a balloon-like and malleable volume for containing fluid and allowing fluid to communicate from the bladder 130 to the open channel or from the open channel into the bladder 130. The substrate 110 again includes a substantially transparent and relatively rigid continuous planar substrate 110 that defines a through-bore in the center region, an open channel across the back surface of the substrate 110, and a via 118 passing through the border area at the end of the fluid channel 116, the open channel extending from the border area of the substrate 110 into the center region of the substrate 110. In this implementation, the trough 134 and the substrate 110 join to define a cavity 144 that contains the bladder 130. The trough 134 can have a substantially dovetail-shaped cross-section or any other cross-section shape suitable for the trough 134. By compressing the bladder 130, fluid within the bladder 130 applies a force on the interior surface of the bladder 130 and the walls of the trough 134.

A variation of the dynamic tactile interface 100 further includes a reservoir 138 fluidly coupled to the fluid channel 116, the fluid channel 116 defining a first end and a second end opposite the first end, the bladder 130 fluidly coupled to the first end of the fluid channel 116, the reservoir 138 fluidly coupled to the second end of the fluid channel 116. Generally, the reservoir 138 can function to store fluid and build back pressure on the fluid system of the dynamic tactile interface 100 (i.e., the fluid conduit 114, the fluid channel 116, the via 118, and the bladder 130) such that the deformable regions 122 have a tendency to retract to the retracted setting when the displacement device 140 releases a portion of the bladder 130.

However, the substrate no and the tactile layer 120 can be of any other material, can define the fluid channel 116, the via 118, and the fluid conduit 114 in any other way, and can function or cooperate in any other way to define the bladder 130. Alternatively, the bladder 130 can be of any other form or material physically coextensive with or discrete from the tactile layer 120 and/or the substrate no, such as described in described in U.S. patent application Ser. No. 14/081,519, which is incorporated in its entirety by this reference. The bladder 130 can also be arranged over a portion of the substrate no coincident with the touchscreen of the computing device. For example, the bladder 130 can be arranged in the center region of the substrate no, such as over the substrate no adjacent or physically coextensive with the tactile layer 120. The bladder 130 can also be remote from the substrate no and the tactile layer 120.

The dynamic tactile interface 100 can include a volume of fluid contained within the fluid channel 116 and the fluid conduit 114, the displacement device 140 displacing a portion of the volume of fluid (or the entire volume of fluid) from the bladder 130 and into the fluid channel 116 to transition the deformable region 122 from the retracted setting into the expanded setting. Generally, the volume of fluid can function to flow through the fluid channel 116 and the fluid conduit 114 in order to transition the deformable region 122 between the expanded and retracted settings. The volume of fluid can be manipulated by the displacement device 140 to selectively transition the deformable region 122 between the expanded setting and the retracted setting. For example, the displacement device 140 can pump fluid into the fluid channel 116 within the substrate 110 to expand the deformable region 122 thereby transitioning the deformable region 122 from the retracted setting into the expanded setting, and the displacement device 140 can pump fluid out of the fluid channel 116 to retract the deformable region 122 thereby transitioning the deformable region 122 from the expanded setting back into the retracted setting.

The volume of fluid can be substantially transparent, translucent, and/or opaque. Thus, the volume of fluid can be water, alcohol, silicone oil, air, or any other suitable type of fluid (e.g., gas or liquid). Additionally, the volume of fluid can function to minimize a refractive index gradient between the substrate and the fluid. For example, the volume of fluid can include suspended particulate (e.g., PMMA nanoparticles) that affect optical transmission of light through the tactile layer 120. Thus, the volume of fluid can aid transmission of light through the tactile layer 120, limit reflection off the tactile surface, and/or to and limit optical aberration due to the tactile layer.

In one example of the foregoing implementation, the tactile layer 120 and the substrate 110 can include a substantially transparent material and the volume of fluid can include a substantially transparent fluid, the volume of fluid, the tactile layer 120, and the substrate 110 communicating an image rendered by the display 180.

6. Displacement Device

The displacement device 140 is configured to compress the bladder 130 to displace fluid from the bladder 130 into the fluid channel 116 through the via 118 in order to transition the deformable region 122 from a retracted setting to an expanded setting. Generally, the displacement device 140 is configured to communicate a force or torque (e.g., an input by the user to an actuator 160 coupled to the displacement device 140) in order to compress the bladder 130.

6.1 Displacement Device: Platen and Structure

Figure 10A:
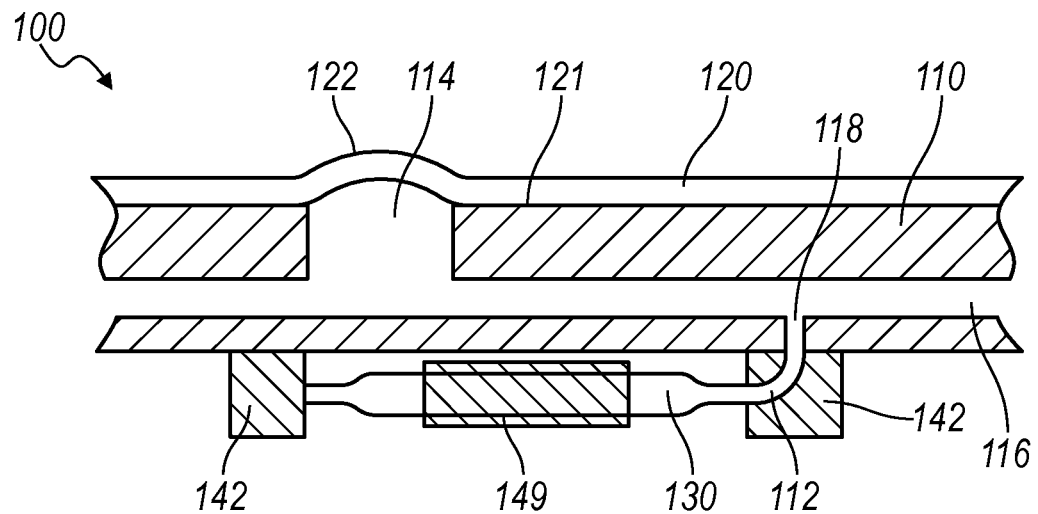
FIGS. 10A and 10B are schematic representations of one variation of the dynamic tactile interface.
Figure 10B:
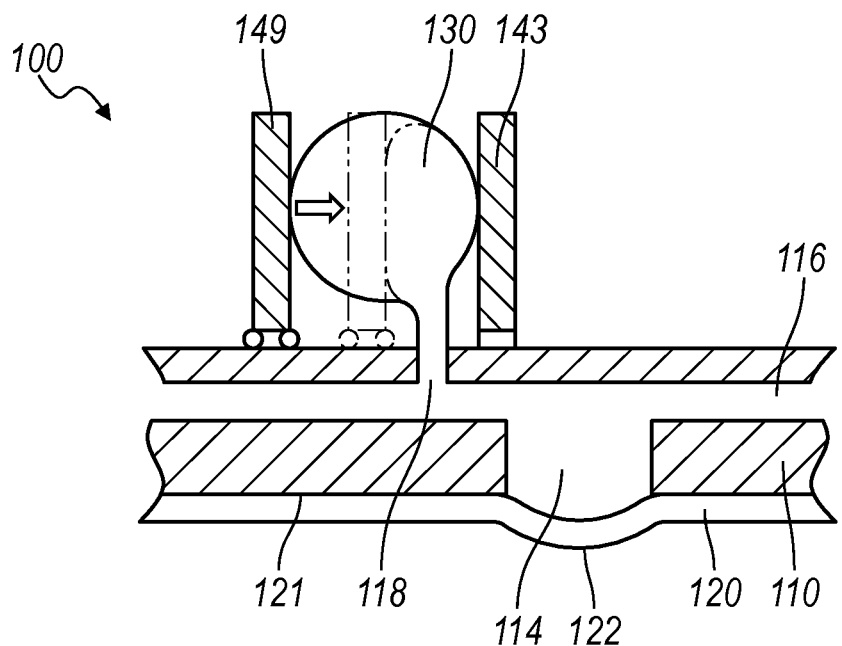

In one variation of the dynamic tactile interface 100 shown in FIG. 7, the displacement device 140 includes a structure 143 adjacent a first side of the bladder 130 and a platen 149 adjacent a second side of the bladder 130 opposite the first side and compressing the bladder 130 against the structure 143 in a direction substantially perpendicular the longitudinal axis of the bladder 130 and substantially parallel the back surface of the substrate 110 to displace fluid from the bladder 130, through the via 118, and into the fluid channel 116 to transition the deformable region 122 from a retracted setting into an expanded setting, the deformable region 122 tactilely distinguishable from the peripheral region 121 in the expanded setting. Generally, the platen 149 functions to communicate a force or torque (e.g., from an input by the user coupled to the platen 149) to translate, rotate, or otherwise move the platen 149 toward the structure 143, thereby compressing the bladder 130 toward the structure 143 as shown in FIGS. 10A and 10B. The platen 149 can translate, rotate, or otherwise move parallel the back surface and, thus, compress the bladder 130 in a direction parallel the back surface, thereby limiting force applied perpendicular to the back surface of the substrate 110, which can cause the substrate 110 to lift away from a computing device over which the dynamic tactile layer 120 can be arranged.

The platen 149 defines a movable (i.e., translatable, rotatable, etc.) surface configured to press on the first side of the bladder 130, thereby reducing the volume of the bladder 130 to displace fluid from the bladder 130 to the fluid channel 116. The platen 149 can also press the first side of the bladder 130 toward a structure 143—a second surface proximal the second side of the bladder 130—in order to compress the bladder 130 between the platen 149 and the structure 143. The structure 143 can be a stationary surface or can move relative the bladder 130 and the platen 149 in order to compress the bladder 130. For example, the structure 143 can be rigidly coupled to the back surface of the substrate 110, such that the structure 143 extends substantially perpendicular the back surface. The platen 149 can translate toward the structure 143, thereby compressing the first side of the bladder 130 toward the second side of the bladder 130. In another example, the structure 143 can be movably coupled to the back surface of the substrate 110, such that the structure 143 can translate parallel the back surface, along a path parallel a path along which the platen 149 translates, and from a first position to a second position proximal the platen 149. Thus, the platen 149 and the structure 143 can translate substantially simultaneously toward each other, thereby squeezing the first side of the bladder 130 and the second side of the bladder 130 together.

In one implementation, the platen 149 can include a member with a substantially planar surface adjacent the first side of the bladder 130. In an implementation in which the membrane 132 of the bladder 130 is substantially pliant, the first side of the bladder 130 can conform to the planar surface of the platen 149.

In another implementation, the platen 149 can define a contacting surface that contacts the first side of the bladder 130 and substantially conforms to the natural form of the bladder 130 (e.g., a form of the bladder 130 when the bladder 130 is fully expanded). For example, the bladder 130 can include an elongated cylindrical tube. The contacting surface can define a curved surface with a radius of curvature substantially corresponding to a radius of curvature of an external surface of the bladder 130. In this example, the contacting surface can contact a portion of a circumferential surface of the bladder 130 (e.g., one-fourth or one-half).

The platen 149 and/or the structure 143 can be of a substantially rigid material (e.g., acrylic, polycarbonate, etc.) such that force applied to translate the structure 143 and/or the platen 149 can be communicated to compression of the bladder 130 without substantial losses due to compression of the platen 149 and the structure 143. Alternatively, the platen 149 and/or the structure 143 can be of a compressible material or include a compressible coating. The compressible material (or coating) can partially collapse or conform to the bladder 130 as the structure 143 and platen 149 compress the bladder 130, thereby limiting local stress (and strain) applied to the membrane 132 of the bladder 130 and risk of puncture of the bladder 130. For example, the platen 149 can include a porous compressible coating (e.g., foam) adjacent the first side of the bladder 130, the porous compressible coating conforming to an outer surface of the bladder 130, such that the compressible coating supports a substantial portion of the surface area of the bladder 130 proximal the platen 149 and the platen 149 can evenly compress the substantial portion of the bladder 130 to limit strain on the membrane 132 of the bladder 130.

The platen 149 can be extend from the back surface of the substrate no and can be movably coupled to the back surface. In one implementation, the platen 149 can be coupled to a guide or a track etched (or otherwise formed) in the back surface of the substrate no. The platen 149 can include a member configured to mate with the guide and retain the platen 149 adjacent the back surface with a translational degree of freedom. The platen 149 can translate along a substantially linear path. Alternatively, the platen 149 can translate non-linearly, such as along a sinuous path.

In one example of the foregoing implementation, the displacement device 140 includes a housing 150, a platen 149, and a sliding lever that slides along a track defined by the housing 150 and thereby pushes the platen 149 as the lever slides in order to compress the bladder 130. As described above, once the substrate no/tactile layer 120/bladder 130 assembly is arranged over the touchscreen of the device, the bladder 130 is supported off the side of the device by the housing 150. The platen 149 can be adjacent the bladder 130 and coupled to the sliding lever. The sliding lever acts as a user interface, which a user can manually manipulate to translate the lever. Displacement of the lever causes corresponding displacement of the platen 149, which can compress the bladder 130.

In another implementation, the platen 149 can be rotationally coupled to the back surface. For example, the platen 149 can pivot about a pin coupling the platen 149 to the back surface, the pin retaining the platen 149 adjacent the back surface with a rotational degree of freedom about the pin. The bladder 130 can be arranged about the pin defining a crescent shape with a focus coincident the pivot axis. The platen 149 can pivot about the pin to compress an end of the crescent shape.

Additionally, the platen 149 can translate, rotate, or otherwise move substantially parallel (or coincident) a central (e.g., longitudinal) axis of the bladder 130. For example, the bladder 130 can include an elongated cylinder with a longitudinal axis through the center of the circular cross-section of the elongated cylinder. Platen 149 can translate parallel the longitudinal axis of the bladder 130 such that the first side of the bladder 130 includes an end of the bladder 130 with a circular cross-section. The platen 149 can also translate, rotate, or otherwise move substantially perpendicular the central or longitudinal axis of the bladder 130. In a similar example, the platen 149 compresses a circumferential surface of the elongated cylinder perpendicular the longitudinal axis such that the first side of the bladder 130 includes a portion of the circumferential surface of the bladder 130. Alternatively, the platen 149 can move in any suitable direction relative the central axis of the bladder 130.

In one example of the foregoing implementation, the bladder 130 can include a crescent-shaped vessel with a substantially circular cross-section and a central axis coincident a center of the circular cross-section. The platen 149 can be configured to rotate about a pin coincident a focus of the crescent-shaped vessel, the surface of the platen 149 coincident an end of the bladder 130 with a circular cross-section.

In one example implementation, the bladder 130 is defined by a trough 134 with a substantially canoe-like cross-section and the substrate no corresponding to a flat top portion of the canoe-like-shaped bladder 130. The bladder 130 can include substantially collapsible bow and stern portions of the canoe-like shape. Thus when the platen 149 applies pressure to the bladder 130, the collapsible bow and stern portions collapse more readily than the rest of the trough 134 and collapse such that the elastomer at the collapsible bow and stern portions are flush with the substrate no in the collapsed state, thereby reducing stress on the elastomer at the collapsible bow and stern. In this example implementation, the platen 149 can compress the bladder 130 by pressing on an end of the bladder 130 (e.g., the bow and/or stern portions). As the slide lever slides along the track defined by the housing 150, the lever displaces the platen 149, which presses on the bladder 130 causing the collapsible bow and/or stern to collapse, thereby displacing fluid from the bladder 130.

However, the platen 149 can translate, rotate, or move relative the back surface of the substrate 110 and be coupled to the back surface in any other way suitable to compress the bladder 130.

Figure 4A:
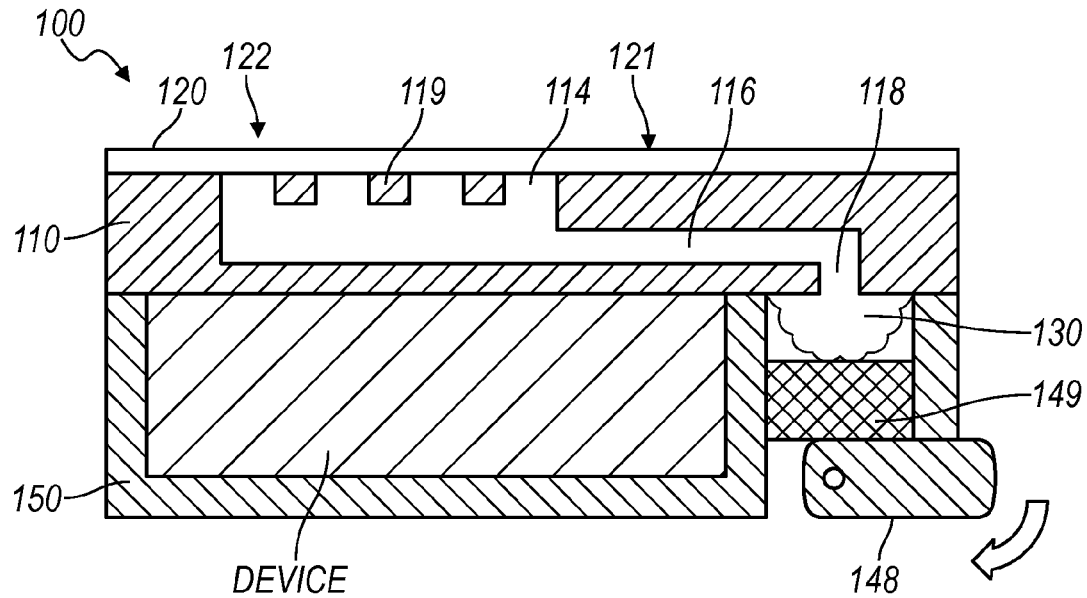
FIGS. 4A and 4B are schematic representations of one variation of the dynamic tactile interface.
Figure 4B:
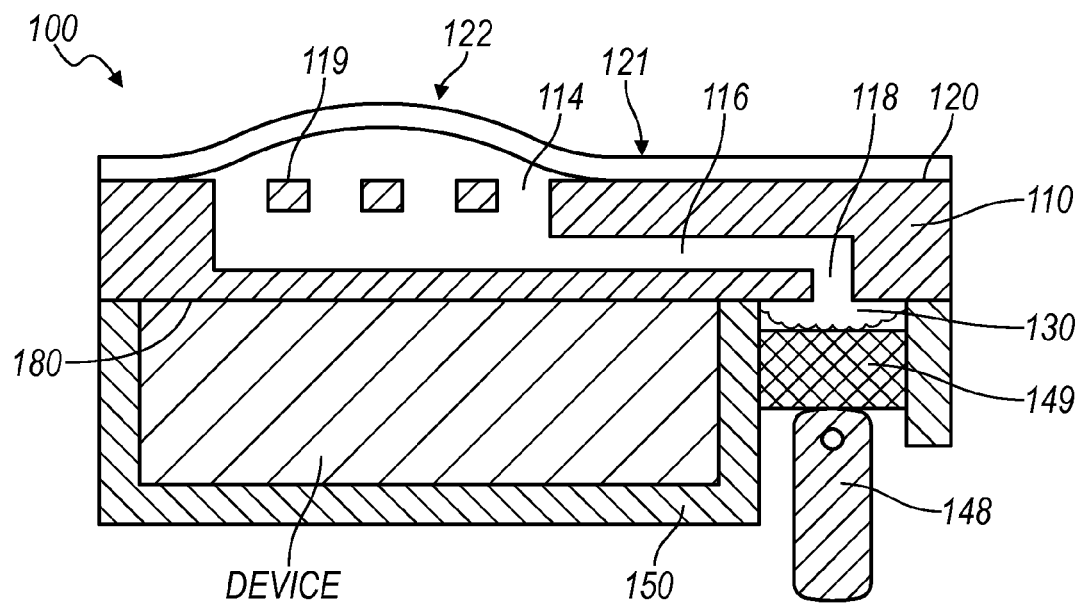
Figure 5A:
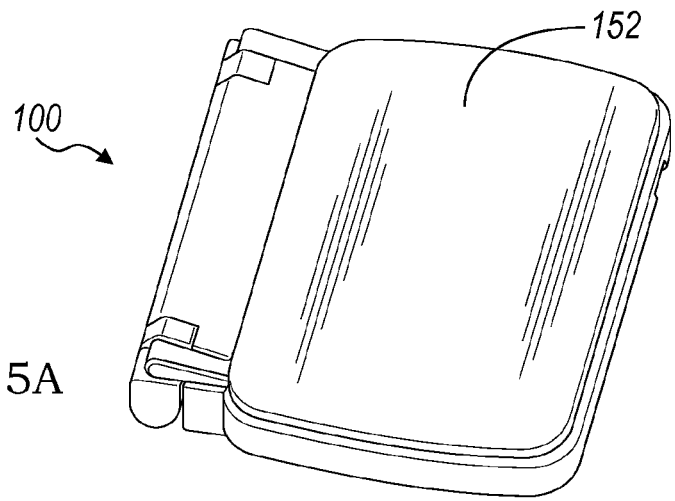
FIGS. 5A, 5B, and 5C are schematic representations of one variation of the dynamic tactile interface.
Figure 5B:
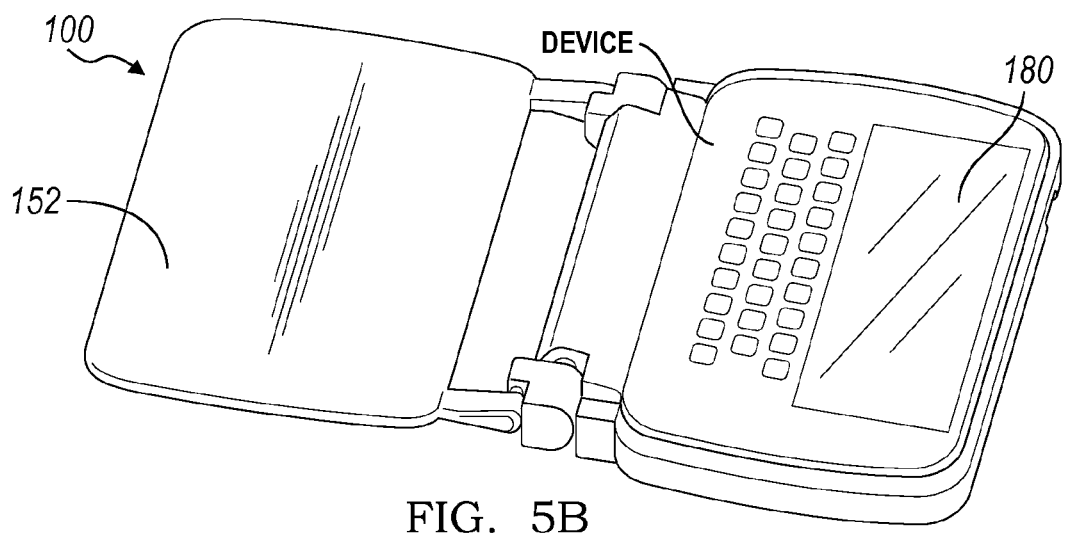
Figure 5C:
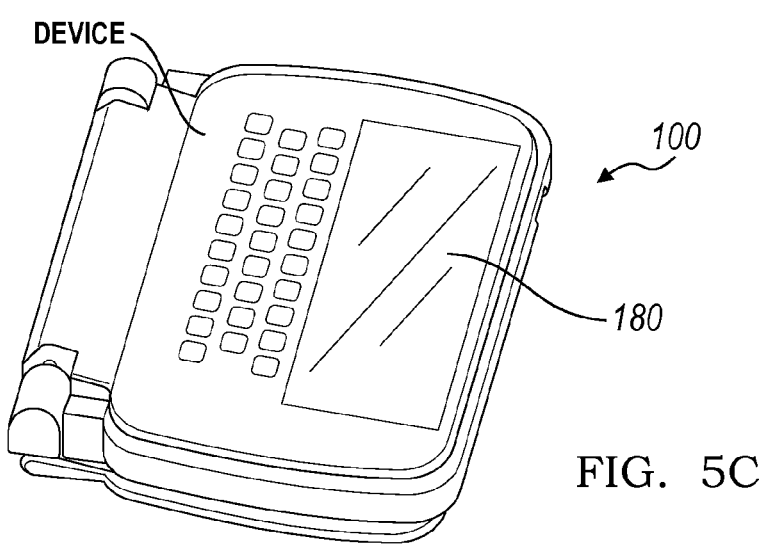
Figure 6A:
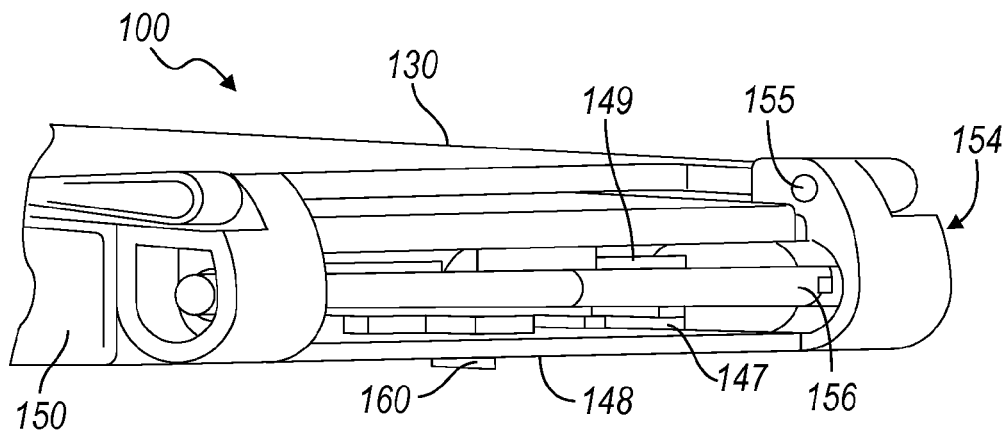
FIGS. 6A, 6B, and 6C are schematic representations of one variation of the dynamic tactile interface.
Figure 6B:
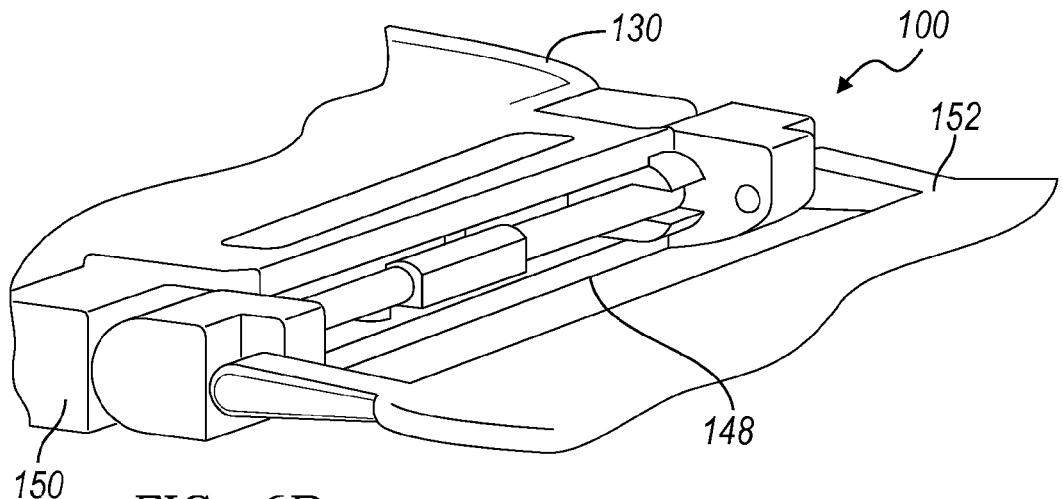
Figure 6C:
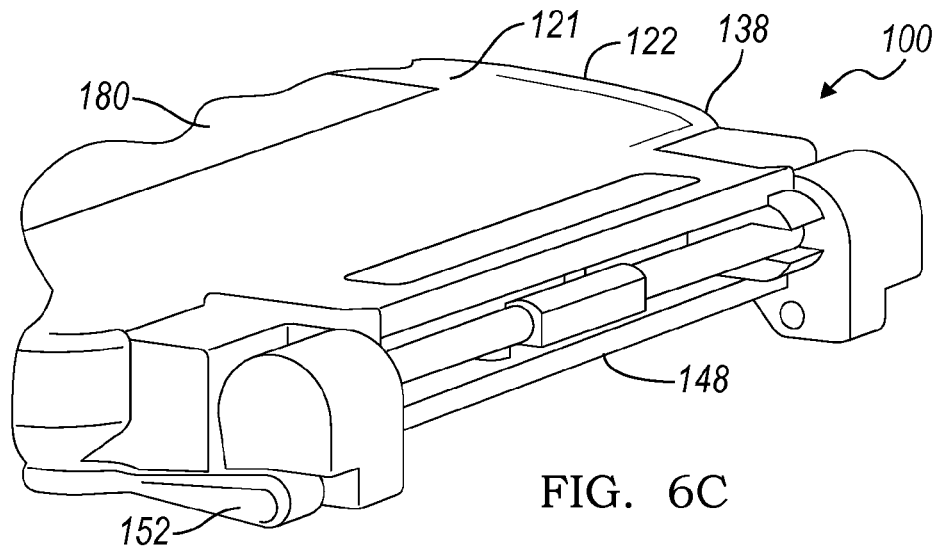

In an implementation of the variation shown in FIGS. 4A and 4B, the displacement device 140 can include a housing 150, a platen 149, and a cam 148. As described above, the substrate no/tactile layer 120/bladder 130 assembly can be arranged over a touchscreen of the computing device and the bladder 130 can be supported off the side of the device. A housing 150 can then receive the device with the bladder 130 adjacent a guide defined by the housing 150. The platen 149 can, thus, run in the guide, and the cam 148 can displace the platen 149 linearly into the bladder 130 as the cam 148 rotates about a pivot defined by the housing 150. For example, the cam 148 can be physically coextensive with a lever arranged parallel and adjacent a long side of an attached smartphone such that a user, holding the smartphone in a right hand of the user, can grasp and rotate the lever with an index finger of the right hand, thus displacing the platen 149 into the bladder 130, compressing the bladder 130, and displacing fluid into the deformable region 122. To retract the deformable region 122, the user can flip the lever back to an original position of the lever, thereby releasing the platen 149 from the bladder 130.

In this implementation, the cam 148 can define two steady-state positions or rest states. For example, the cam 148 can define a first planar surface and a second planar surface perpendicular to the first planar surface and connect to the first planar surface by a curved or profiled surface. Thus, the first planar surface can rest against the platen 149 opposite the bladder 130 in the retracted setting shown in FIG. 4A, the curved or profiled surface can engage the platen 149 along a sliding line contact as the cam 148 is actuated, and the second planar surface can rest against the platen 149 opposite the bladder 130 in the expanded setting, as shown in FIG. 4B.

However, in this implementation, the platen 149, the housing 150, and the cam 148 can cooperate in any other way to compress and release the bladder 130 to transition the deformable region 122 into the expanded setting and the retracted setting, respectively.

In another implementation, the dynamic tactile interface 100 can further include an actuator 160 translating the platen 149 parallel the back surface and along the longitudinal axis of the bladder 130 to compress the bladder 130 against the structure 143 in response to manual actuation of the actuator 160. The actuator 160 can define a lever movably coupled to the housing 150, the lever defining a manual interface actuating the actuator 160 in response to a manual input to the lever. Alternatively, the actuator 160 can define a button, knob, or any other means suitable to translate, rotate, or move the platen 149. Furthermore, the actuator 160 can couple to the structure 143 to actuate the structure 143 toward the platen 149, thereby squeezing the first side of the bladder 130 and the second side of the bladder 130 together. For example, the actuator 160 can include a first lever and a second lever coupled to an outer surface of a housing 150 transiently arranging the substrate 110 and tactile layer 120 over a computing device. The first lever can couple to the platen 149 and translate from first position to a center position. The second lever, coupled to the structure 143, can translate toward and parallel the first lever from a second position to the center position. Thus, a user can actuate the platen 149 and the structure 143 substantially simultaneously by squeezing the first lever (from the first position) and the second lever (from the second position) to the center position substantially simultaneously.

Figure 9:
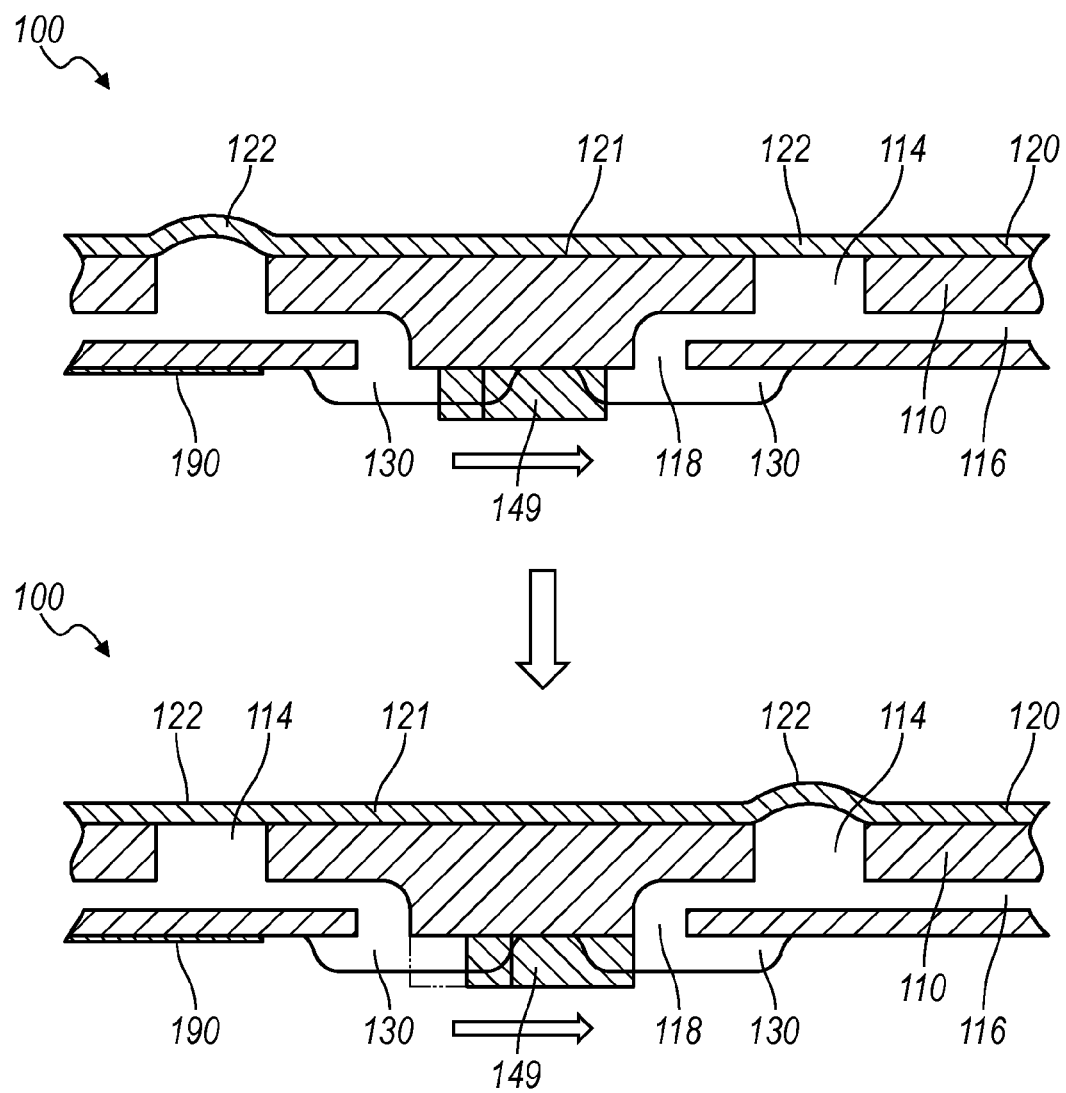
FIG. 9 is a flowchart representation of one variation of the dynamic tactile interface.

In another implementation of the variation shown in FIG. 9, the tactile layer 120 defines a second deformable region 122 and the substrate no defines a second fluid conduit 114 adjacent the second deformable region 122 and a second fluid channel 116 fluidly coupled to the second fluid conduit 114. In this implementation, the dynamic tactile interface 100 also includes a second bladder 130 opposite the platen 149 from the bladder 130, the second bladder 130 fluidly coupled to the second fluid channel 116 and the second fluid conduit 114 and configured to transition the second deformable region 122, the platen 149 configured to compress the bladder 130 and to release the second bladder 130 to transition the deformable region 122 from the retracted setting to the expanded setting and to transition the second deformable region 122 from the expanded setting to the retracted setting substantially simultaneously. Likewise, as the platen 149 moves toward the second bladder 130 and, thus, away from the bladder 130, the platen 149 compresses the second bladder 130 and releases (i.e., expands) the bladder 130, thereby transition the second deformable region 122 from the retracted setting to the expanded setting. The dynamic tactile can also include a display 180 coupled to the back surface of the substrate 110 and selectively rendering an image of a first virtual keyboard and an image of a second virtual keyboard, the deformable region 122 aligned with a key of the first virtual keyboard and the second deformable region 122 aligned with a key of a second virtual keyboard.

6.2 Displacement Device: Sleeve

One variation of the dynamic tactile interface 100 shown in FIGS. 11A, 11B, and 11C includes a sleeve 147 defining a valley 146 of a first cross-section proximal a first end of the sleeve 147 and of a second cross-section proximal a second end of the sleeve 147, the first cross-section of an area less than an area of the second cross-section, the sleeve 147 operable between a first position and a second position; a bladder 130 fluidly coupled to the via 118, adjacent the back surface of the substrate 110, defining a longitudinal axis, and arranged within the valley 146; a volume of fluid arranged within the bladder 130; and an actuator 160 coupled to the sleeve 147 and translating the sleeve 147 in a direction substantially parallel the longitudinal axis from the first position to the second position to displace fluid from the bladder 130, through the via 118, and into the fluid channel 116 to transition the deformable region 122 from the retracted setting to the expanded setting, the sleeve 147 proximal a first end of the bladder 130 releasing a portion of the bladder 130 in the first position and proximal a second end of the bladder 130 and constricting the portion of the bladder 130 in the second position. Generally, the sleeve 147 functions to constrict the bladder 130 as the sleeve 147 travels along the longitudinal axis, thereby reducing the effective volume of the bladder 130 and displacing fluid from the bladder 130 into the via 118.

The sleeve 147 can define a valley 146 of a first cross-section proximal a first end of the sleeve 147 and of a second cross-section proximal a second end of the sleeve 147, the first cross-section of an area less than an area of the second cross-section. The bladder 130, fluidly coupled to the via 118 and adjacent the back surface of the substrate no, can define a longitudinal axis and be arranged within the valley 146. The sleeve 147 can be of any material and of any geometry suitable to support the bladder 130 and displace fluid from the bladder 130 by constricting a portion of the bladder 130. The sleeve 147 can be of a substantially rigid material (e.g., acrylic, polycarbonate, etc.) such that force applied to translate the valley 146 can be communicated to constrict of the bladder 130 without substantially losses due to compression of the material of the sleeve 147. Alternatively, the sleeve 147 can be of a compressible material or include a compressible coating lining a surface of the valley 146. The compressible material (or coating) can partially collapse or conform to the bladder 130 as the structure 143 and sleeve 147 compress the bladder 130, thereby limiting local stress (and strain) applied to the membrane 132 of the bladder 130 and risk of puncture of the bladder 130. For example, the sleeve 147 can include a porous compressible coating (e.g., foam) lining an inner surface of the valley 146 and adjacent the bladder 130, the porous compressible coating conforming to an outer surface of the bladder 130, such that the compressible coating supports a substantial portion of the surface area of the bladder 130 proximal the sleeve 147 and the sleeve 147 can evenly compress the substantial portion of the bladder 130 to limit strain on the membrane 132 of the bladder 130.

The sleeve 147 and the valley 146 of the sleeve 147 can define any geometry suitable to support the bladder 130 and travel along the length of the bladder 130. In one implementation shown in FIG. 12, the valley 146 can define a dovetail cross section including a narrow neck profile and a wide tail profile, the narrow neck profile adjacent the back surface and limiting deformation and deflection of the bladder 130 toward the back surface. Alternatively, the valley 146 can have any other cross-section suitable to prevent lifting of the tactile layer 120 away from the substrate 110. For example, the valley 146 can form a substantially circular cross-section with a portion of the circular cross-section coincident an intersection of the trough 134 of the bladder 130 with the tactile layer 120. Thus, by compressing the bladder 130 toward the tactile layer 120, the fluid applies force to an arcuate portion of the valley 146 from which the trough 134 is formed rather than the tactile layer 120. The valley 146 can also define a canoe-shape, tear-drop, polygonal, or any other cross-section.

Figure 15:
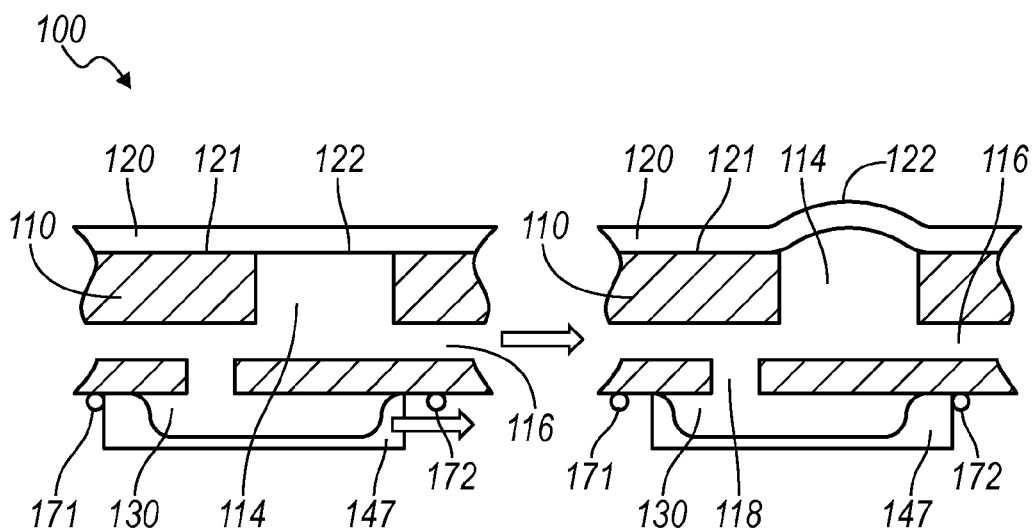
FIG. 15 is a flowchart representation of one variation of the dynamic tactile interface.
Figure 16A:
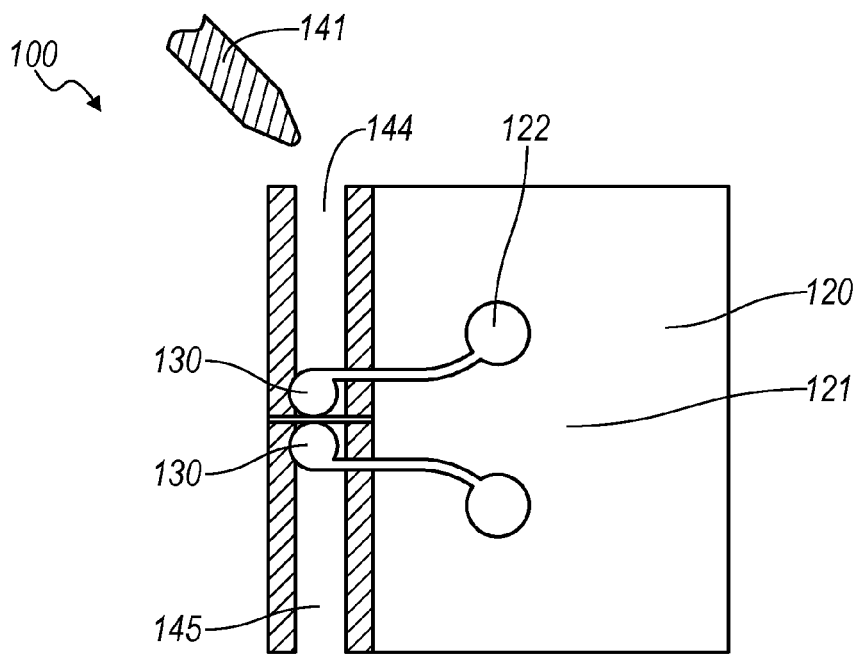
FIGS. 16A, 16B, 16C are schematic representations of one variation of the dynamic tactile interface.
Figure 16B:
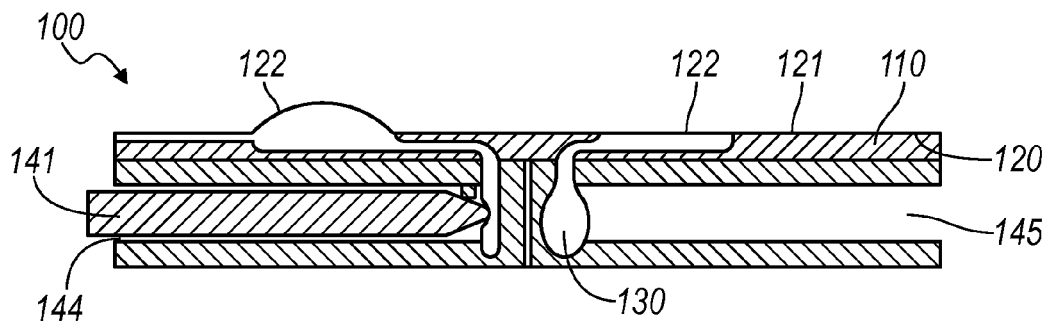
Figure 16C:
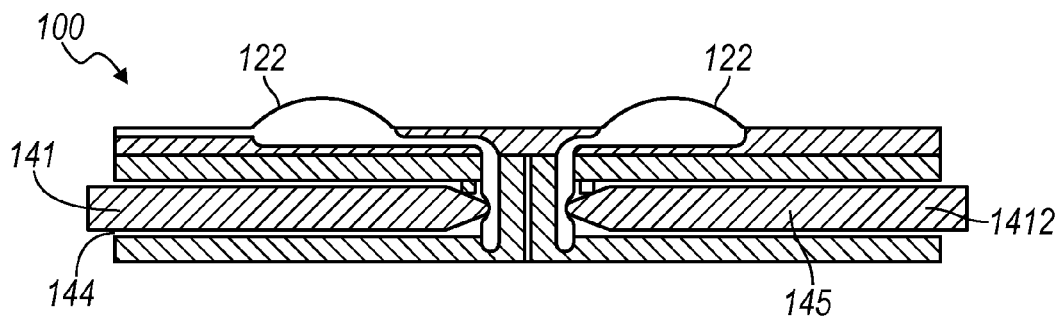

In another implementation, the bladder 130 defines a bladder 130 longitudinal length and the sleeve 147 defines a sleeve 147 longitudinal length longer than the bladder 130 longitudinal length, an entirety of the bladder 130 longitudinal length supported by the valley 146 in the first position and in the second position as shown in FIG. 15. Thus, as the sleeve 147 travels along the length of the bladder 130, the supports the bladder 130 and limits stretching (i.e., bubbling) of the bladder 130 proximal the second end of the sleeve 147. Therefore, the sleeve 147 can communicate translation substantially directly to compression of the bladder 130 and displacement of fluid from the bladder 130 with limited losses due to elastic expansion of the bladder 130. Alternatively, the sleeve 147 can span a portion of the length of the bladder 130.

In another implementation, the valley 146 can define a contacting surface that contacts one or more surfaces of the bladder 130 and substantially conforms to the natural form of the bladder 130 (e.g., a form of the bladder 130 when the bladder 130 is fully expanded). For example, the bladder 130 can include an elongated cylindrical tube. The contacting surface can define a curved surface with a radius of curvature substantially corresponding to a radius of curvature of an external surface of the bladder 130. In this example, the contacting surface can contact a portion of a circumferential surface of the bladder 130 (e.g., one-fourth or one-half).

The sleeve 147 defines a movable (i.e., translatable, rotatable, etc.) surface configured to compress the surfaces of the bladder 130, thereby reducing the volume of the bladder 130 to displace fluid from the bladder 130 to the fluid channel 116. The sleeve 147 can translate, rotate, or otherwise move substantially parallel (or coincident) a central (e.g., longitudinal) axis of the bladder 130. A path defined by the travel of the sleeve 147 can be linear or nonlinear. For example, the bladder 130 can include an elongated cylinder with a longitudinal axis through the center of the circular cross-section of the elongated cylinder. The sleeve 147 can translate parallel the longitudinal axis of the bladder 130 such that the first side of the bladder 130 includes an end of the bladder 130 with a circular cross-section. Alternatively, the sleeve 147 can move in any suitable direction relative the central axis of the bladder 130.

In an implementation in which the membrane 132 of the bladder 130 is substantially pliant, the bladder 130 can conform to the valley 146. Like the platen 149, the sleeve 147 can travel parallel the longitudinal (or central) axis of the bladder 130, thereby constricting (or compressing inner surfaces of the bladder 130 toward each other). However, the sleeve 147 can substantially or partially surround the bladder 130 in order to constrict the bladder 130. Alternatively, inner surfaces of the sleeve 147 can travel perpendicular the central axis of the bladder 130 to constrict the walls of the bladder 130. For example, the sleeve 147 can define a valley 146 of a substantially circular cross-section, the valley 146 including movable surfaces adjacent the membrane 132 of the bladder 130 that can radially constrict a portion of the bladder 130. The movable surfaces define claws that draw radially toward the central axis of the bladder 130 to constrict the bladder 130 and return radially away from the central axis to expand the bladder 130.

The sleeve 147 can extend from the back surface of the substrate no and can be movably coupled to the back surface. In one implementation, the sleeve 147 can be coupled to a guide or a track etched (or otherwise formed) in the back surface of the substrate no. The sleeve 147 can include a member configured to mate with the guide and retain the sleeve 147 adjacent the back surface with a translational degree of freedom. The sleeve 147 can translate along a substantially linear path. Alternatively, the sleeve 147 can translate non-linearly, such as along a sinuous path.

Figure 13A:
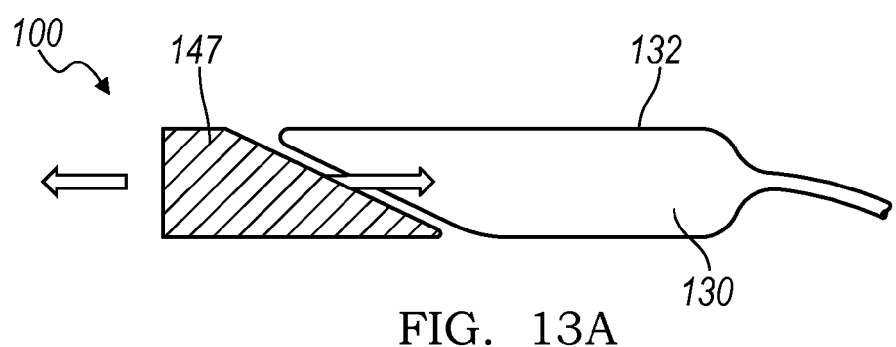
FIGS. 13A and 13B are schematic representations of one variation of the dynamic tactile interface.
Figure 13B:
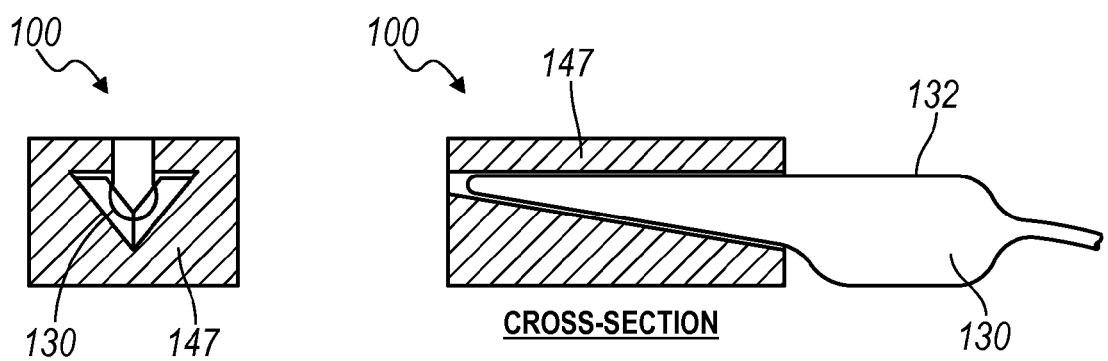

In an implementation of the variation shown in FIGS. 13A and 13B, the bladder 130 can be defined by an elastomeric sheet with a substantially canoe-like cross-section cooperating with the back surface of the substrate 110 to define canoe-like-shaped bladder 130. The sleeve 147 engages the trough 134 and defines a longitudinal axis coincident the longitudinal axis of the bladder 130. The sleeve 147 is also tapered along the longitudinal axis of the bladder 130 extending from the bow to the stern and is coupled to the slide lever. If, for example, the sleeve 147 slides from bow to stern along the bladder 130, the sleeve 147 can define a ramp cross-section, such that a side of the ramp cross-section distal the stern can be configured to displace the bladder 130 more than a side of the ramp cross-section proximal the stern (e.g., the side of the ramp cross-section distal the stern can be oriented closer to the substrate no than the side of the ramp cross-section proximal the stern). Thus, as the sleeve 147 slides, the sleeve 147 applies graduated pressure to the bladder 130, wherein graduation corresponds to the angle of the ramp cross-section, thereby decreasing stress on the bladder 130 while still deforming the bladder 130 and, thus, displacing fluid from the bladder 130. The bladder 130 can also preferentially collapse at select regions along a length of the bladder 130.

Figure 12:
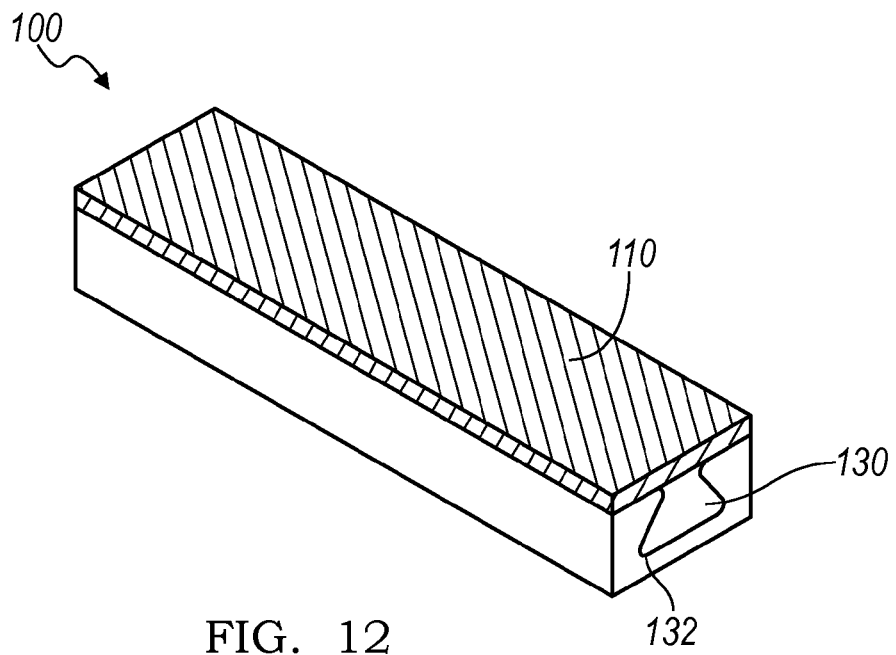
FIG. 12 is a schematic representation of one variation of the dynamic tactile interface.

In an example of the previous implementation shown in FIG. 12, the trough 134 molded from the elastomeric sheet forms a substantially dovetail cross-section, in which a substantially converged portion of the dovetail cross-section (i.e., a narrow neck portion) can be adjacent the substrate no and a diverged portion of the dovetail cross-section (i.e., a portion of the cross-section that is widest) can be opposite the tactile layer 120. The substrate 110 closes the trough 134 to form the bladder 130. The sleeve 147 can define a valley 146 also of a dovetail cross-section tapering in inner cross-section area (of the valley 146) from a first (larger area) end of the sleeve 147 to a second (smaller area) end of the sleeve 147. The sleeve 147 can be of a length equal to a length dimension of the bladder 130 plus a maximum displacement distance (i.e., a maximum distance the sleeve 147 travels to displace fluid from the bladder 130). The sleeve 147 can define the first position proximal (or coincident) a first end of the bladder 130, such that a portion of the valley 146 contacts and supports the entire length of the bladder 130 in the first position. Likewise, the sleeve 147 can define the second position, such that a portion of the valley 146 contacts and supports the entirety of the bladder 130, the sleeve 147 substantially optimizes fluid displacement from the bladder 130, and the sleeve 147 is located between the first end of the bladder 130 and the second end of the bladder 130 in the second position. The valley 146 can support the bladder 130 such that the first end of the sleeve 147 is arranged proximal the second end of the bladder 130 and the second end of the sleeve 147 is arranged proximal the first end of the bladder 130. The converged, narrow-neck portion of the dovetail cross-section of the valley 146 substantially forms a compression surface toward which the bladder 130 is compressed as the sleeve 147 slides along the length of the bladder 130. The compression surface can substantially limit force applied by the fluid within the bladder 130 directly on the substrate no, thereby limiting lift of the substrate no off an adjacent device or away from the housing 150. When the tactile layer 120 forms the compression surface, a compressive force applied by the fluid on the substrate no and, therefore, the tactile layer 120 causes the tactile layer 120 to lift off (i.e., separate) from the substrate 110 or bend away from the substrate 110. Thus, compression of the bladder 130 toward the substrate 110 and, therefore, the tactile layer 120 applies pressure to the converged portion of the dovetail cross-section and limits lifting of the tactile layer 120 away from the substrate 110.

The actuator 160 can be coupled to the sleeve 147 and can be configured to translate the sleeve 147 in a direction substantially parallel the longitudinal axis from the first position to the second position to displace fluid from the bladder 130, through the via 118, and into the fluid channel 116 to transition the deformable region 122 from the retracted setting to the expanded setting, the sleeve 147 proximal a first end of the bladder 130 releasing a portion of the bladder 130 in the first position and proximal a second end of the bladder 130 and constricting the portion of the bladder 130 in the second position. The actuator 160 can also be coupled to an external surface of a housing 150 engaging a computing device and transiently supporting the substrate no and tactile layer 120 over a display 180 of the computing device. The actuator 160 can define a lever, a button, a knob, a switch, or any other manually actuable interface configured to displace the sleeve 147 to compress the bladder 130. Alternatively, the actuator 160 can be an electromechanical device configured to electromechanically translate the sleeve 147 (and/or the platen 149).

In one implementation, the actuator 160 can define a first stop 171 corresponding to the first position of the sleeve 147 and a second stop 172 corresponding to the second position of the sleeve 147, the actuator 160 translating between the first stop 171 and the second stop 172, the first stop 171 and the second stop 172 limiting translation of the sleeve 147 to between the first position and the second position. In this implementation, the actuator 160 can restrict a travel distance to prevent over compression or over expansion of the bladder 130 when the sleeve 147 travels outside a defined travel space between (and including) the first position and the second position. In an example, the actuator 160 can be translationally coupled to a track in an external surface of the housing 150, the actuator 160 translating within the track. The first stop 171 and the second stop 172 can include a lip, an edge, or a detent in the track, which can limit travel of the actuator 160 beyond the first stop 171. The first stop 171 and the second stop 172 can also define a semi-permanent gate inserted in the track (or other path of the actuator 160) and can be moved to recalibrate appropriate travel distances, the first position, and the second position for the sleeve 147. Over time, fluid within the bladder 130 can evaporate. Thus, to maintain fluid pressure within the bladder 130 and a volume of fluid for transitioning the deformable region 122, a user can move the semi-permanent gate to recalibrate the first position and the second position of the sleeve 147 and compensate for fluid loss.

In one example, the displacement device 140 includes a housing 150, a sleeve 147, and a actuator 160 that slides along a track defined by the housing 150 and thereby pushes the sleeve 147 as the actuator 160 slides in order to compress the bladder 130. As described above, once the substrate no/tactile layer 120/bladder 130 assembly can be arranged over a touchscreen of the device, the bladder 130 is supported off the side of the device by the housing 150. The bladder 130 can be arranged within the valley 146 of the sleeve 147 and the sleeve 147 can be coupled to the actuator 160. The actuator 160 acts as a user interface, which a user can manually manipulate to translate the sleeve 147. Displacement of the actuator 160 causes corresponding displacement of the platen 149, which can compress the bladder 130.

However, the sleeve 147 and the actuator 160 can translate, rotate, or travel relative the back surface of the substrate no and be coupled to the back surface in any other way suitable to compress the bladder 130.

In this and other variations, the dynamic tactile interface 100 can further include a shield substantially or partially surrounding the bladder 130, the shield limiting outward radial expansion of the bladder 130 (i.e., bubbling) in response to compression of a portion of the bladder 130. Thus, the shield can function to provide a support surface about the bladder 130 such that pressure applied to the bladder 130 be communicated to can preferentially displace fluid from the bladder 130 rather than stretch the membrane 132 of the bladder 130.

6.3 Displacement Device: Stylus

Figure 18:
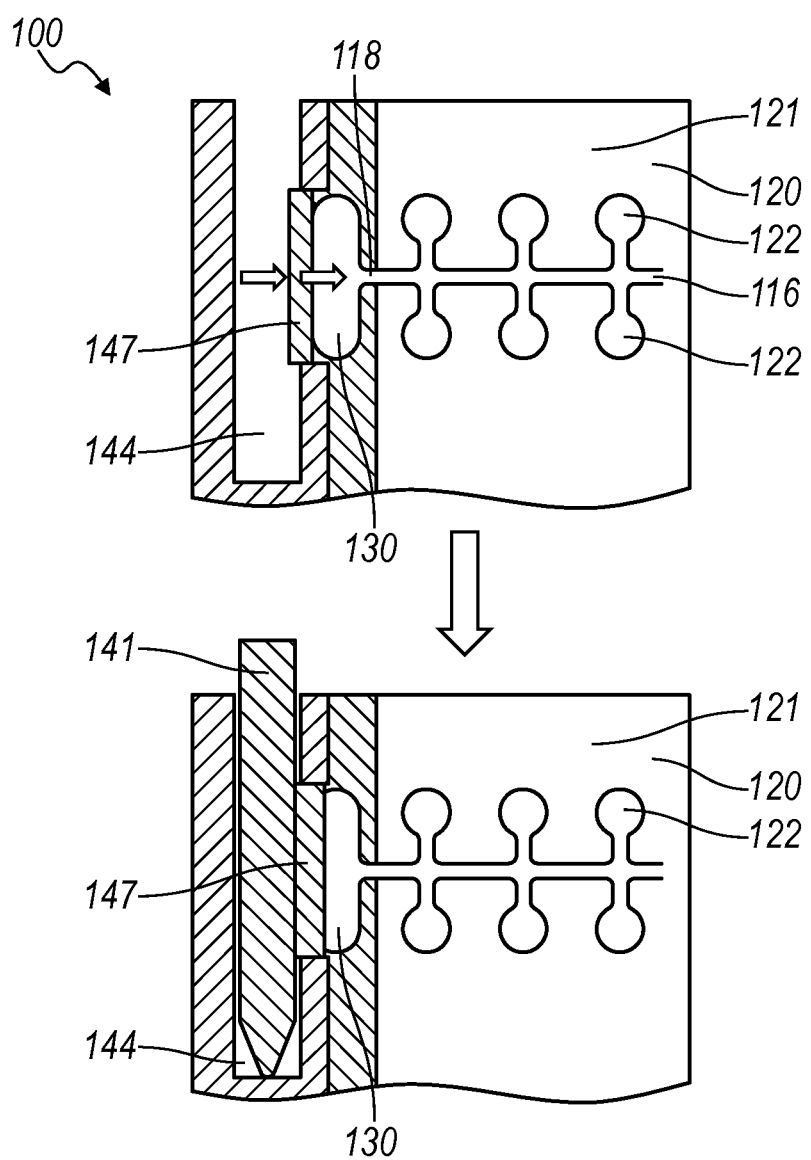
FIG. 18 is a flowchart representation of one variation of the dynamic tactile interface.

Another variation of the dynamic tactile interface 100 includes: a tactile layer 120 defining a peripheral region 121 and a deformable region 122 adjacent the peripheral region 121, the deformable region 122 operable between a retracted setting and an expanded setting, the deformable region 122 tactilely distinguishable from the peripheral region 121 in the expanded setting; a substrate 110 including an attachment surface and coupled to the peripheral region 121, the substrate 110 defining a fluid conduit 114 adjacent the deformable region 122 and a fluid channel 116 fluidly coupled to the fluid conduit 114; a border region proximal a periphery of the substrate 110, the border region defining a cavity 144 configured to receive an instrument 141, the cavity 144 supporting the instrument 141 in a first configuration and releasing the instrument 141 in a second configuration; and a bladder 130 fluidly coupled to the fluid channel 116 and coupled to the cavity 144, the instrument 141 compressing a portion of the bladder 130 in the first configuration to displace fluid from the bladder 130 into the fluid channel 116 to transition the deformable region 122 from the retracted setting to the expanded setting, the instrument 141 releasing a portion of the bladder 130 in the second configuration. Generally, the dynamic tactile interface 100 functions to define a housing 150 for a computing device configured to receive an instrument 141 such as a stylus 141 and store the instrument 141 in a cavity 144 adjacent the computing device, the cavity 144 supporting the bladder 130, the instrument 141 compressing the bladder 130 when the instrument 141 is inserted within the cavity 144. Thus, the instrument 141 cooperates with the cavity 144 to define the displacement device 140. The instrument can press directly on the membrane of the bladder. Alternatively, as shown in FIG. 18, the instrument can press on a platen, lever, or other member adjacent the bladder, such that translation of the platen in response insertion of the instrument in the cavity compresses the bladder.

A similar variation of the dynamic tactile interface 100 includes: a tactile layer 120 defining a peripheral region 121 and a deformable region 122 adjacent the peripheral region 121, the deformable region 122 operable between a retracted setting and an expanded setting, the deformable region 122 tactilely distinguishable from the peripheral region 121 in the expanded setting; a substrate 110 including an attachment surface and coupled to the peripheral region 121, the substrate 110 defining a fluid conduit 114 adjacent the deformable region 122 and a fluid channel 116 fluidly coupled to the fluid conduit 114; a housing 150 supporting the tactile layer 120 and the substrate 110, configured to engage a computing device, and transiently retaining the substrate 110 and the tactile layer 120 over a surface of the computing device, the housing 150 defining a cavity 144 adjacent the computing device and configured to transiently receive an instrument 141, the cavity 144 supporting the instrument 141 in a first configuration and releasing the instrument 141 in a second configuration; and a bladder 130 fluidly coupled to the fluid channel 116 and arranged within the cavity 144, the instrument 141 compressing a portion of the bladder 130 in the first configuration to displace fluid from the bladder 130 into the fluid channel 116 to transition the deformable region 122 from the retracted setting to the expanded setting, the instrument 141 releasing a portion of the bladder 130 in the first configuration to displace fluid from the fluid channel 116 and transition the deformable region 122 from the expanded setting to the retracted setting.

In this variation and the preceding variation, as a user inserts the instrument 141 (e.g., a stylus 141) into a home position in the hard case, the displacement device 140 can communicate a force provide by the user through the stylus 141 into the bladder 130 in order to displace fluid into the fluid channel 116. In yet another example, the displacement device 140 can trip a latch to release a spring, thereby applying force to the bladder 130 in response to a force or torque applied by a user to open the hard case or to insert a stylus 141 into a home position.

Figure 2A:
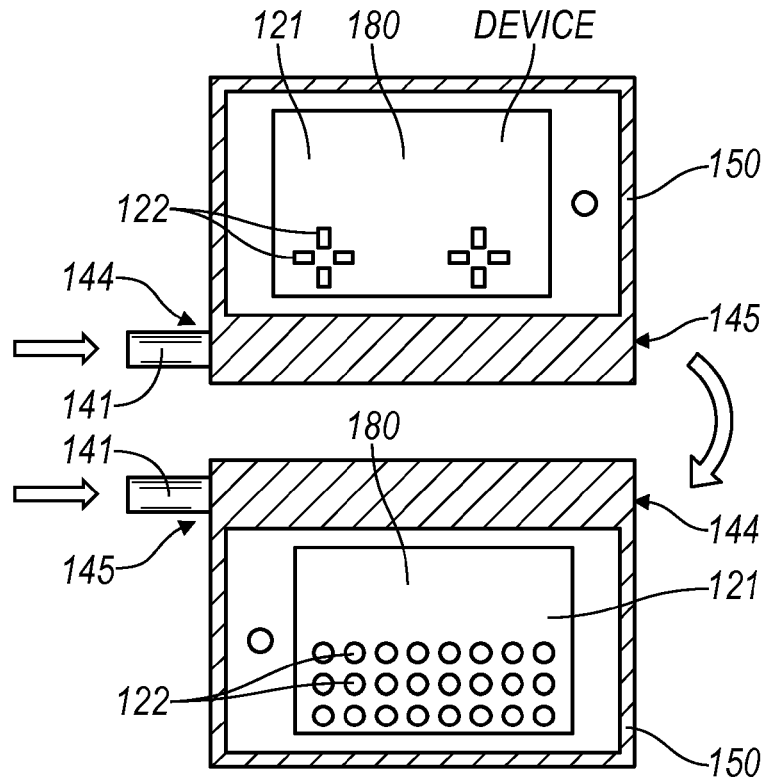
FIGS. 2A and 2B are schematic representations of variations of the dynamic tactile interface.
Figure 2B:
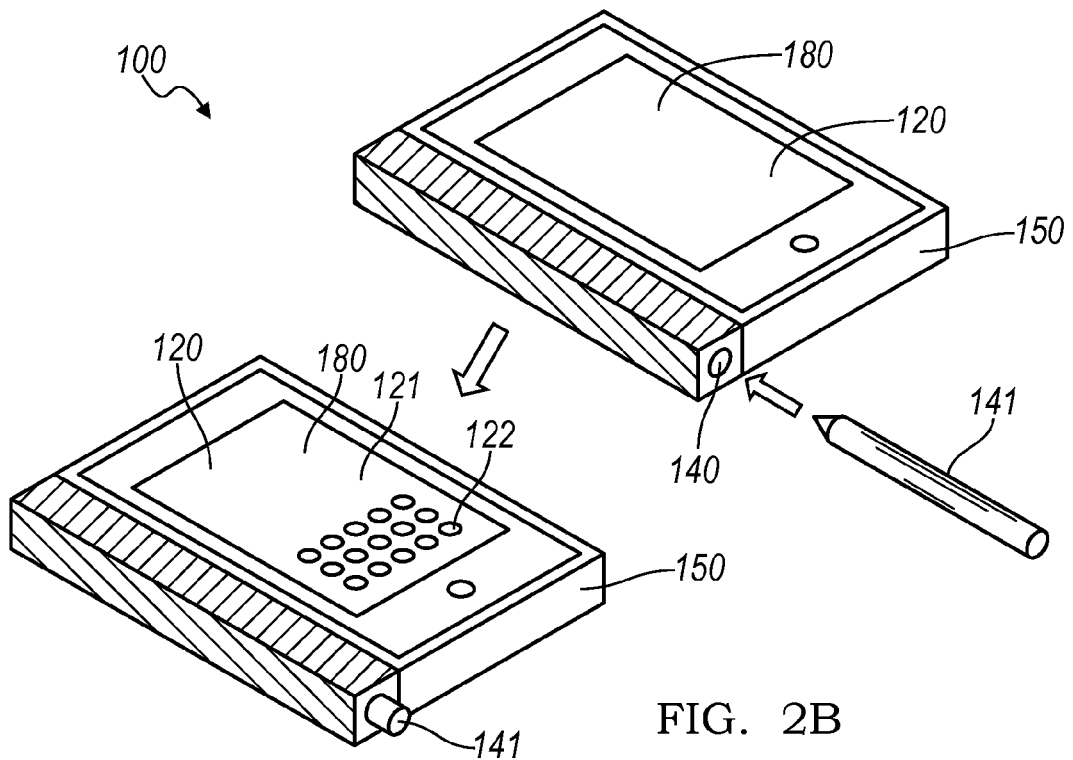
Figure 3:
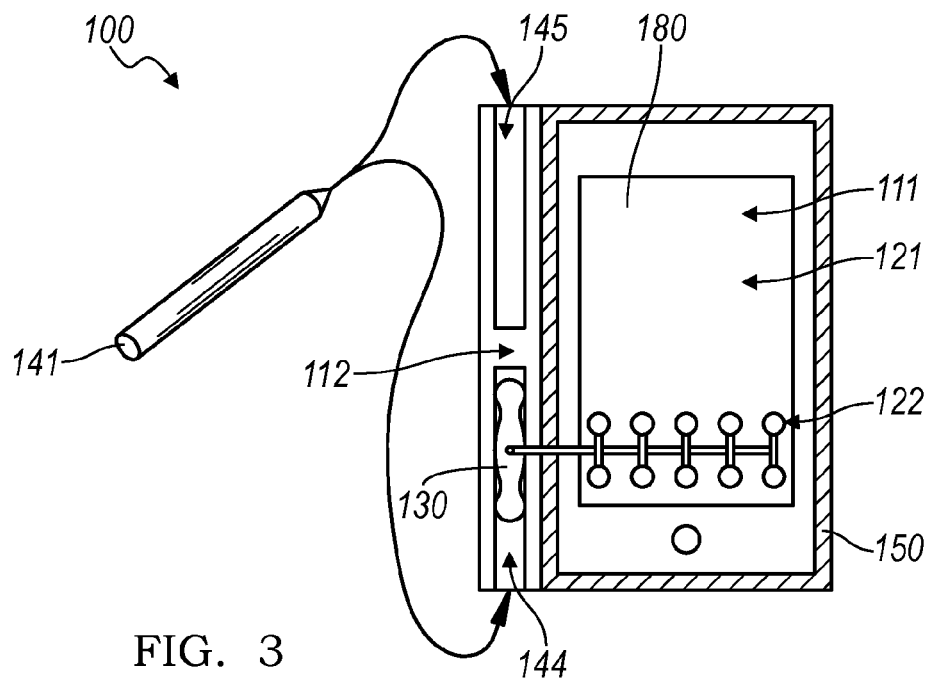
FIG. 3 is a schematic representation of a dynamic tactile interface.

In one implementation shown in FIG. 2B, the displacement device 140 includes a housing 150 and can be configured to receive the instrument 141, such as a stylus 141. The housing 150 couples to and/or encases a perimeter of the attached mobile computing device and defines a first cavity 144 and a second cavity 145 that are configured to accept the stylus 141, as shown in FIGS. 3, 16A, 16B, and 16C. As described above, once the substrate 110, tactile layer 120, and bladder 130 assembly can be arranged over a touchscreen of the device, the bladder 130 is supported off the side of the device. In this variation, the housing 150 defines the second bore adjacent the bladder 130. By manually inserting the stylus 141 into the second bore, the stylus 141 contacts and, therefore, compresses the bladder 130, thereby displacing fluid out of the bladder 130 into the fluid channel 116 in order to expand the deformable region 122. The stylus 141 can then be removed from the second cavity 145 and returned to the first cavity 144 that is remote from the bladder 130, thereby releasing pressure on the bladder 130. Thus, fluid can flow back into the bladder 130 and the deformable region 122 can return to the retracted setting.

In one example, the stylus 141 is cylindrical with a hemispherical, conical, or frustoconical end. The first and second cavity 145$s$ can also be cylindrical in form, such that each supports a running fit with the stylus 141. The stylus 141 can also include a cap at a posterior end of the stylus 141, the cap larger in diameter than a main section of the stylus 141 to define an endstop for insertion of the stylus 141 into either of the cavity 144$d$. The cap can also be of an elastomer, such as silicone, and/or include a rib or other feature to aid extraction of the stylus 141 from either of the cavity 144$s$. The main section of the stylus 141 can be rigid, such as extruded aluminum or a cold-rolled stainless steel tube, and the anterior end of the stylus 141 can include a soft tip, such as a velvet or wool tip. Alternatively, the cavity 144 can define a stop (e.g., a lip or other protrusion) extending from an inner surface of the cavity 144 and proximal the bladder 130, the stop configured to mate with a surface of the instrument 141 in the first configuration to limit translation of the instrument 141 into the cavity 144 beyond the stop and to define a maximum displacement of fluid from the bladder 130.

In one implementation, the substrate 110 defines multiple fluid conduits 114 fluidly coupled to the bladder 130 by the via 118, and the tactile layer 120 defines a set of deformable regions 122, each adjacent a fluid conduit 114, such that compression of the bladder 130 displaced fluid into the fluid channel 116 to substantially simultaneously expand all of the deformable regions 122 in the set of deformable regions 122. For example, in this implementation, each deformable region 122 in the set of deformable regions 122 can correspond to and be substantially aligned with a character of a virtual alphanumeric keyboard rendered on the touchscreen such that each deformable region 122 in the set of deformable regions 122 can tactilely guide a user in selecting a corresponding key from the virtual keyboard. Thus, when the stylus 141 is inserted into the second bore, the stylus 141 can compress the bladder 130 to expand the set of deformable regions 122 substantially simultaneously. Then, to retract the set of deformable regions 122, the stylus 141 can be returned to the second cavity 145.

Alternatively, in a similar implementation, the stylus 141 can define a flat along a dorsal side such that, when the stylus 141 is inserted into the first cavity 144 with dorsal side of the stylus 141 facing away from the bladder 130, the ventral side of the stylus 141 contacts and compresses the bladder 130. However, in this implementation, when the stylus 141 is inserted into the first cavity 144 with the dorsal side of the stylus 141 facing the bladder 130, the flat along the dorsal side of the stylus 141 passes the bladder 130 without substantially compressing the bladder 130. Thus, in this implementation, a user can adjust an orientation of the stylus 141 (e.g., by rotating the stylus 141 180° about an (anteroposterior) axis of the stylus 141 within the first cavity 144 to switch the deformable region 122 between the expanded and retracted settings. The first cavity 144 can also define one or more features that engage the stylus 141 in either of the foregoing positions as the stylus 141 is inserted therein. Thus, in this implementation, the housing 150 can omit the second cavity 145 as the first cavity 144 defines a home position for the stylus 141 with the deformable region 122 both retracted and expanded.

Similarly, the stylus 141 can define a first diameter or cross section along a first section of the stylus 141, and the stylus 141 can define a second diameter or cross section along a second section of the stylus 141 discrete from the first section such that the stylus 141 can be flipped 180° about a dorsoventral axis of the stylus 141 and reinserted into the first cavity 144 to switch between retracted and expanded settings at the deformable region 122 as the first section of the stylus 141 clears (i.e., does not substantially compress) the bladder 130 and as the second section of the stylus 141 does compress the bladder 130 when inserted into the first cavity 144. In a similar configuration, the stylus 141 can refine a constant cross-section of varying radius such that, once inserted into the first cavity 144, the stylus 141 can be rotated to different arcuate positions, thereby adjusting compression of the bladder 130 (and thus the size, shape, etc. of the deformable region 122. In this configuration, the base (i.e., far end) of the first cavity 144 can engage and support a tip of the stylus 141 such that the axis of the stylus 141 is maintained as the stylus 141 rotates. Furthermore, in this or other similar implementations, the stylus 141 can be keyed for the opening of the first (and second) cavity 144 such that the stylus 141 can only be inserted into the first cavity 144 in one (or in a select few) orientation(s), as shown in FIG. 11. For example, the stylus 141 can be keyed to the input side of the first cavity 144 such that the stylus 141 does not compress the bladder 130 when inserted but can be driven into the platen 149 to compress the bore by rotating the stylus 141 once fully inserted into the first cavity 144.

Furthermore, the substrate 110 can define a second set of fluid conduits 114, a second via 118 passing through the substrate 110 in the border area, and a second fluid channel 116 coupled to the second via 118 and to the second set of fluid conduits 114. The tactile layer 120 can also include a second set of deformable regions 122, each deformable region 122 in the second set of deformable regions 122 adjacent a fluid conduit 114 in the second set of fluid conduits 114. The dynamic tactile interface 100 can further include a second bladder 130 configured to contain fluid and coupled to the border area over the second via 118 and opposite the tactile layer 120. The second bladder 130, the second via 118, the second fluid channels 116, the second set of fluid conduits 114, and the second set of deformable regions 122 can thus define a second closed fluid system discreet from the (first) closed fluid system described above. In this implementation, the second cavity 145 can be adjacent the second bladder 130 such that the (first) set of deformable regions 122 can be transitioned into the expanded setting—independent of the second set of deformable regions 122—by inserting the stylus 141 into the first cavity 144, and such that the second set of deformable regions 122 can be transitioned into the expanded setting—independent of the first set of deformable regions 122—by inserting the stylus 141 into the second cavity 145. For example, the (first) second of deformable regions 122 can correspond to alphanumeric keys of a virtual keyboard rendered on the touchscreen (as described above), and the second set of deformable regions 122 can correspond to a set of gaming controls, such as a pair of direction pads (i.e., d-pads), as shown in FIG. 2A.

In this variation, the first cavity 144 (and/or the second cavity 145) can include a detent configured to engage a series of detent positions on the stylus 141 such that the stylus 141 can be inserted into the first cavity 144 to a particular depth and retained by the detect. In particular, the depth of the stylus 141 in the first cavity 144 can be manually adjusted by the user to change compression of the bladder 130, thereby adjusting a size, a volume, and/or a firmness of the deformable region 122, and the detent can hold the stylus 141 in position until adjusted or removed by the user. Alternatively, the stylus 141 can similarly include a detent that engages subsequent detent positions defined within the first cavity 144 (and/or the second cavity 145).

Yet alternatively, the displacement device 140 can include a set of stylus 141es, each stylus 141 in the set of a different length and/or profile such that full insertion of one stylus 141 yields a different degree of compression of the bladder 130 than full insertion of another stylus 141 into the first cavity 144. In particular, a user can set a particular size, shape, and/or firmness, etc. of the deformable region 122 in the expanded setting by selecting a particular stylus 141 from the set of stylus 141es for insertion into the first cavity 144. Similarly, the displacement device 140 can include a single stylus 141 with a set of tips, and the user can install a particular tip—from the set of tips—onto the stylus 141 to set a level of compression of the bladder 130 at full insertion of the stylus 141 into the first cavity 144. For example, each tip in the set can be of a different cross-section, diameter, and/or length.

Furthermore, in this variation, the displacement device 140 can include a ramp arranged between the bladder 130 and the first cavity 144. In particular, the ramp can function as a buffer between the stylus 141 and the bladder 130 to communicate a lateral force from the stylus 141 into the bladder 130 as the stylus 141 enters the first cavity 144 such that linear translation of the stylus 141 into the first cavity 144 does not tear the bladder 130. For example, the ramp can define a flexible elastomeric sheet retained at each end proximal the anterior and posterior ends of the first cavity 144. Alternatively, the ramp can define a rigid structure 143 that engages guides within the housing 150 between the bladder 130 and the first elongated tube to distribute a lateral force from the stylus 141 substantially uniformly across the length of the bladder 130 as the stylus 141 is inserted into the first cavity 144. However, the ramp can be of any other form and configured in any other way to transmit a force from the stylus 141 into the bladder 130. (In this variation, the displacement device 140 can similarly include a second ramp arranged between the second bladder 130 and the second cavity 145.)

In a similar implementation, the displacement device 140 can include a slide defining a waveform (or ramp, etc.) profile adjacent the bladder 130. In this implementation, the first and second cavity 145s can share a common axis, and the sleeve 147 can be arranged within a guide between the cavity 144s with the waveform profile of the sleeve 147 adjacent the bladder 130. Thus, as the stylus 141 is inserted into the first cavity 144, the anterior tip of the stylus 141 can contact a first end of the sleeve 147, thus displacing the sleeve 147 away from the first cavity 144, forcing a tall section of the waveform profile into the bladder 130, and compressing the bladder 130 between the substrate 110 and the tall section of the waveform profile. One the stylus 141 is removed from the first cavity 144, the waveform profile of the sleeve 147 can retain the sleeve 147 in this position. However, as the stylus 141 is inserted into the second cavity 145, the anterior tip of the stylus 141 can contact an opposite end of the sleeve 147, thus displacing the sleeve 147 away from the second cavity 145 (and toward the first cavity 144), forcing a short section of the waveform profile toward the bladder 130, and releasing the bladder 130 such that the bladder 130 can expand to an original form and draw fluid back out of the fluid channel 116 through the via 118.

In the foregoing implementation, the sleeve 147 can also include a tab extending substantially perpendicular from an axis of the sleeve 147 and through the housing 150 such that the position of the sleeve 147 can be manually controlled by moving the tab fore and aft, thereby transitioning the deformable region 122 into the expanded setting and into the retracted setting, respectively. For example, the tab can run and extend through a guide defined along the back of the housing 150.

In this and other variations, the displacement device 140 can further include a manually actuated valve arranged between the bladder 130 and the fluid channel 116. In particular, the valve can be closed and the bladder 130 compressed to store pressure for a period of time until a user releases the valve, thus enabling fluid to flow from the bladder 130 into the fluid channel 116 to transition the deformable region 122 into the retracted setting. For example, the valve can be controlled or accessed on through a level, pawl, or other mechanism arranged on the housing 150.

In this and other variations, the housing 150 can substantially encompass the perimeter and/or the back of the computing device. For example, the housing 150 can include a unitary plastic injection-molded structure 143 configured to snap onto a mobile computing device. The housing 150 can also define the first and/or second cavity 145s adjacent a long edge of the computing device and adjacent the border area of the substrate no with the bladder 130 (and the second bladder 130). The housing 150 can further include a cover 152 configured to snap over the first and second cavity 145s and the border area of the substrate no to retain the border area against the housing 150. However, in this configuration, the displacement device 140 can include any other component or mechanism in any other configuration to transition the deformable between settings in response to insertion of a stylus 141 into a corresponding bore or home position in a housing 150 or hard case for a corresponding mobile computing device.

In a implementation of the variation, the border region defines a second cavity 144 configured to receive the instrument 141, the second cavity 144 supporting the instrument 141 in a third configuration and releasing the instrument 141 in the second configuration; wherein the tactile layer 120 defines a second deformable region 122; wherein the substrate no defines a second fluid channel 116 and a second fluid conduit 114 adjacent the second deformable region 122 and fluidly coupled to the second fluid channel 116; further including a second bladder 130 coupled to the second cavity 144, the instrument 141 compressing a portion of the second bladder 130 in the third configuration to displace fluid from the second bladder 130 into the second fluid channel 116 to transition the second deformable region 122 from the retracted setting to the expanded setting, the instrument 141 releasing the portion of the second bladder 130 in the second configuration. The second cavity 144 can define a longitudinal axis substantially corresponding to a longitudinal axis of the first cavity 144. The dynamic tactile interface 100 can also include a display 180 arranged under the back surface of the substrate no and selectively rendering an image of a first virtual keyboard and an image of a second virtual keyboard, the deformable region 122 aligned with a key of the first virtual keyboard and the second deformable region 122 aligned with a key of a second virtual keyboard.

In another implementation, the cavity 144 is configured to receive a second instrument 1412 (e.g., a second stylus 141) and release the second instrument 1412 from the second cavity 144 substantially simultaneously; wherein the instrument 141 compresses the bladder 130 and releases the second bladder 130 substantially simultaneously to transition the deformable region 122 from the retracted setting to the expanded setting and to transition the second deformable region 122 from the expanded setting to the retracted setting substantially simultaneously. The dynamic tactile interface can also include a touch sensor 190 coupled to the substrate no and configured to output a signal corresponding to an input applied to the tactile layer 120.

Figure 17:
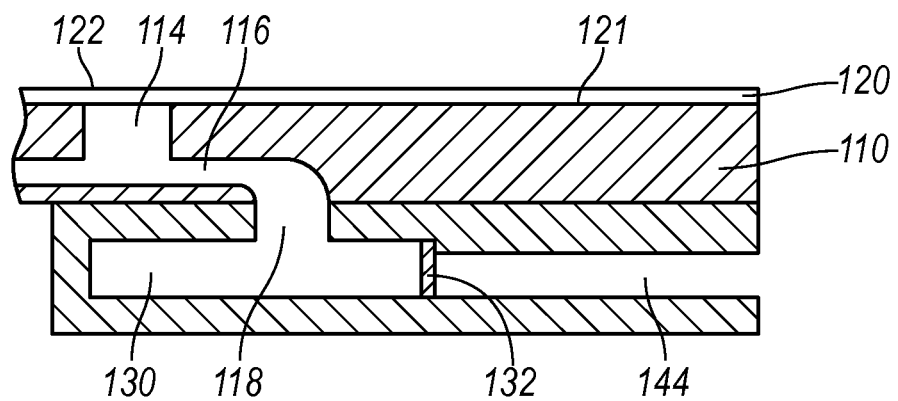
FIG. 17 is a schematic representation of one variation of the dynamic tactile interface.

In another implementation, the variation can include a via 118 fluidly coupling the fluid channel 116 and the bladder 130 and passing through the back surface; wherein the cavity 144 defines an open end and a closed end opposite the open end, the open end configured to receive the instrument 141 into the cavity 144. In this implementation, shown in FIG. 17, the bladder 130 can include an elastomer sheet bonded along a periphery to an inner surface of the cavity 144 between the open end and the closed end, the bladder 130 retaining fluid between the elastomer sheet and the closed end of the cavity 144 coincident the via 118. Thus, the elastomer sheet and the cavity 144 can cooperate to define the bladder 130.

Figure 19:
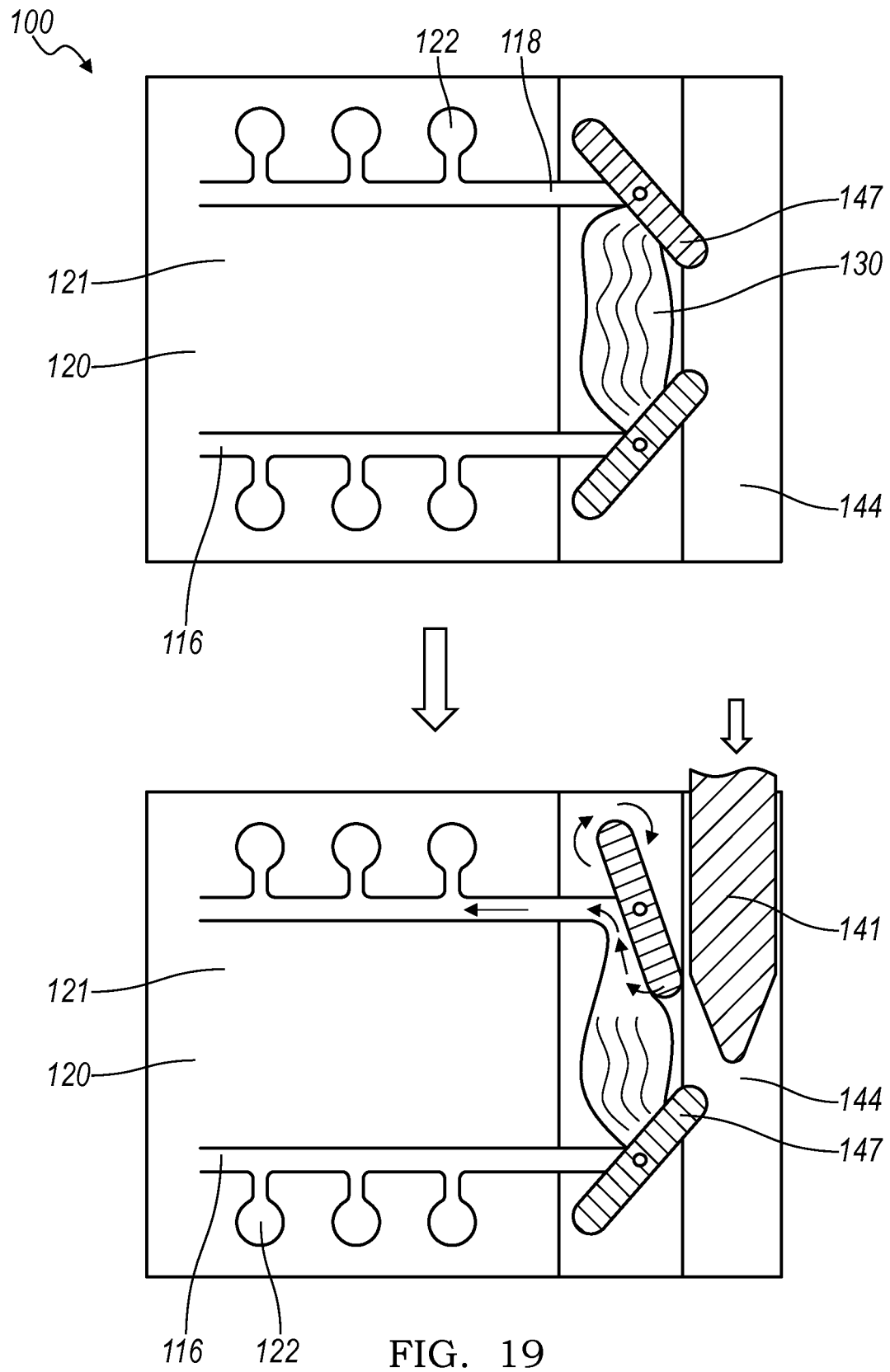
FIG. 19 is a flowchart representation of one variation of the dynamic tactile interface.

In another implementation of the variation and the preceding variation shown in FIG. 19, the tactile layer 120 can include a second deformable region 122 adjacent the peripheral region 121 and the deformable region 122, the substrate no defining a second fluid conduit 114 adjacent the second deformable region 122 and a second fluid channel 116 fluidly coupled to the second fluid conduit 114 and the bladder 130. In this implementation, the bladder 130 can further including a valve fluidly coupled to the bladder 130, the fluid channel 116, and the second fluid channel 116, the valve selectively communicating fluid from the bladder 130 to the fluid channel 116 and the second fluid channel 116 to selectively transition the deformable region 122 and the second deformable region 122. The cavity 144 can define a first opening and a second opening, the cavity 144 configured to receive the instrument 141 into a first portion of the cavity 144 through the first opening and configured to receive the instrument 141 into a second portion of the cavity 144 opposite the first portion through the second opening. The cavity 144 supports the bladder 130 between the first portion and the second portion. The cavity 144 can also include a first lever and a second lever, the first lever coupled to an inner surface of the first portion and the valve, the instrument 141 engaging the first lever in the first portion of the cavity 144 in the first configuration and actuating the valve to communicate fluid from the bladder 130 to the fluid channel 116, the second lever coupled to an inner surface of the second portion and the valve, the instrument 141 engaging the second lever in the first portion of the cavity 144 in the first configuration and actuating the valve to communicate fluid from the bladder 130 to the second fluid channel 116.

The cavity 144 can be configured to receive the instrument 141 defining an exterior cross-section substantially corresponding to and mating with a cross-section of the cavity 144, the instrument 141 concentrically arranged within cavity 144 in the first configuration. Thus, the instrument 141 can be of a substantially similar shape to the cavity 144.

In another implementation, the bladder 130 can include an elongated cylindrical tube defining a closed end and an open end, the open end fluidly coupled to the fluid channel 116 and opposite the closed end, the bladder 130 defining an outer diameter; wherein the cavity 144 defines an internal cross-section substantially corresponding to the outer diameter of the bladder 130, the bladder 130 arranged concentrically within the cavity 144.

In this and other variations of the dynamic tactile interface 100, the surface of the computing device can include a rear surface of the computing device opposite a display 180 of the computing device. The dynamic tactile interface 100 can comprise a touch sensor 190 coupled to the back surface of the substrate no and arranged between the back surface of the substrate 110 and the rear surface of the computing device configured to detect an input applied to the tactile layer 120 and coincident the rear surface. Thus, the dynamic tactile interface 100 can function to define a touch sensitive surface also providing tactile guidance on any surface of the computing device, such as the back, a side, or around a non-touch-sensitive bezel of a touchscreen.

As shown in FIGS. 5A, 5B, 5C, 6A, 6B, and 6C, the variation can also include a cover 152 hinged to an edge of the housing 150, the cover 152 pivotable about the hinge between a first cover 152 position and a second cover 152 position, the cover 152 substantially flush with the tactile layer 120 in the first cover 152 position, the cover 152 substantially flush with a back surface of the housing 150 opposite the tactile layer 120 in the second cover 152 position. The cavity 144 can include a gate transiently coupled to the cavity 144 proximal an opening in the cavity 144 and mechanically coupled to the cover 152, the cavity 144 configured to receive the instrument 141 through the opening, the gate operable between a closed position and an open position, the gate substantially cover 152*ing* the opening in the cavity 144 in the closed position preventing receipt of the instrument 141 into the cavity 144 in response to the cover 152 in the first cover 152 position, the gate opening the opening of the cavity 144 to receive the instrument 141 into the cavity 144 in response to the cover 152 in the second cover 152 position. Thus, the cover 152 can actuate the gate such that the gate blocks 142 insertion of the instrument 141 to the cavity 144 when the cover 152 lies over the tactile layer 120. Consequently, the gate can prevent expansion of the deformable region 122 when the cover 152 lies over the tactile layer 120, thereby limiting damage to the tactile layer 120 and rest of the dynamic tactile interface 100 due to expansion of the deformable regions 122 under an applied load (e.g., the cover 152 pressing on the tactile layer 120).

7. Display

A variation of the dynamic tactile interface 100 shown in FIG. 14 can include a display 180 coupled to the back surface of the substrate 110 and rendering an image of a key substantially aligned with the deformable region 122. Generally, the display 180 can render an image of an input key proximal the deformable region 122 such as described above and in U.S. patent application Ser. No. 13/414,589. The dynamic tactile interface 100 can also include a housing 150 transiently engaging a mobile computing device, the housing 150 transiently retaining the substrate 110 over a digital display 180 of the mobile computing device. For example, the dynamic tactile interface Dm can include an aftermarket housing 150 that surrounds the mobile computing device and arranges the dynamic tactile interface 100 substantially over the display 180 of the mobile computing device. The display 180 can also function to transmit light in the form of an image through the substrate 110 and the tactile layer 120. For example, the display 180 can render an image of an alphanumeric input key of a keyboard aligned with the deformable region 122 thereby indicating an input associated with the deformable region 122. In this example, when the deformable region 122 is in the expanded setting and the display 180 outputs an image of the alphanumerical character "a", selection of the deformable region 122—sensed by the touch sensor 190—can be correlated with selection of the character "a", and the mobile computing device incorporating the dynamic tactile interface 100 can response to the input by adding the character "a" in a text field (e.g., with a SMS text messaging application executing on the mobile computing device). However, the display 180 can function in any other way to display 180 an image of any other type.

8. Touch Sensor

One variation of the dynamic tactile interface 100 can include a sensor coupled to the substrate 110 and outputting a signal according to an input on the tactile surface. The sensor of the dynamic tactile interface 100 can detect an input on the tactile surface. Generally, the sensor functions to sense a change in an electric field or electrical property across the tactile layer 120 and/or substrate 110 and to output a signal accordingly, such that a processor within the computing device can detect an input into the computing device based on the signal. Then the computing device can respond accordingly, such as described in U.S. patent application Ser. No. 13/896,098. The sensor can include a capacitive (or resistive, optical, or other) touch sensor interposed between the substrate no and a display 180 coupled to the substrate 110, the capacitive touch sensor 190 outputting a signal corresponding to an input on a tactile surface of the tactile layer 120 proximal the deformable region 122. The sensor can additionally or alternatively output a signal corresponding to a change in fluid pressure within the fluid channel 116 in response to a force applied to the deformable region 122 of the tactile layer 120. Alternatively, the sensor can include a strain gauge integrated into the tactile layer 120 or arranged between the tactile layer 120 and the substrate 110 and configured to output a signal corresponding to deformation of the tactile layer 120. However, the sensor can function in any other way to detect an input on the tactile surface at the deformable region 122 and/or at the peripheral region 121.

9. Housing

A variation of the dynamic tactile interface 100 can include a housing 150 supporting the substrate 110, the tactile layer 120, the bladder 130, and the sleeve 147, the housing 150 engaging a computing device and retaining the substrate 110 and the tactile layer 120 over a display 180 of the computing device. The housing 150 can also transiently engage the mobile computing device and transiently retain the substrate 110 over a display 180 of the mobile computing device. Generally, in this variation, the housing 150 functions to transiently couple the dynamic tactile interface 100 over a display 180 (e.g., a touchscreen) of a discrete (mobile) computing device, such as described in U.S. patent application Ser. No. 12/830,430. For example, the dynamic tactile interface 100 can define an aftermarket device that can be installed onto a mobile computing device (e.g., a smartphone, a tablet) to update functionality of the mobile computing device to include transient depiction of physical guides or buttons over a touchscreen of the mobile computing device. In this example, the substrate no and tactile layer 120 can be installed over the touchscreen of the mobile computing device, a manually-actuated displacement device 140 can be arranged along a side of the mobile computing device, and the housing 150 can constrain the substrate no and the tactile layer 120 over the touchscreen and can support the displacement device 140. However, the housing 150 can be of any other form and function in any other way to transiently couple the dynamic tactile interface 100 to a discrete computing device.

The systems and methods of the preceding embodiments can be embodied and/or implemented at least in part as a machine configured to receive a computer-readable medium storing computer-readable instructions. The instructions can be executed by computer-executable components integrated with the application, applet, host, server, network, website, communication service, communication interface, native application, frame, iframe, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and the claims, modifications and changes can be made in the foregoing embodiments of the invention without departing from the scope of this invention as defined in the following claims.

We claim:

1. A dynamic tactile interface comprising:
   a tactile layer defining a peripheral region and a deformable region adjacent the peripheral region, the deformable region operable between a retracted setting and an expanded setting, the deformable region tactilely distinguishable from the peripheral region in the expanded setting;
   a substrate comprising an attachment surface and coupled to the peripheral region, the substrate defining a fluid conduit adjacent the deformable region and a fluid channel fluidly coupled to the fluid conduit;
   a border region proximal a periphery of the substrate, the border region defining a cavity configured to receive an instrument, the cavity supporting the instrument in a first configuration and releasing the instrument in a second configuration; and
   a bladder fluidly coupled to the fluid channel and coupled to the cavity, the instrument compressing a portion of the bladder in the first configuration to displace fluid from the bladder into the fluid channel to transition the deformable region from the retracted setting to the expanded setting, the instrument releasing a portion of the bladder in the second configuration,
   wherein the border region defines a second cavity configured to receive the instrument, the second cavity supporting the instrument in a third configuration and releasing the instrument in the second configuration; wherein the tactile layer defines a second deformable region; wherein the substrate defines a second fluid channel and a second fluid conduit adjacent the second deformable region and fluidly coupled to the second fluid channel; further comprising a second bladder coupled to the second cavity, the instrument compressing a portion of the second bladder in the third configuration to displace fluid from the second bladder into the second fluid channel to transition the second deformable region from the retracted setting to the expanded setting, the instrument releasing the portion of the second bladder in the second configuration.

2. The dynamic tactile interface of claim 1, wherein the deformable region defines a surface substantially flush with the peripheral region in the retracted setting and defines a tactilely distinguishable formation offset above the peripheral region in the expanded setting.

3. The dynamic tactile interface of claim 1, wherein the second cavity defines a longitudinal axis substantially corresponding to a longitudinal axis of the first cavity.

4. The dynamic tactile interface of claim 1, further comprising a display arranged under the back surface of the substrate and selectively rendering an image of a first virtual keyboard and an image of a second virtual keyboard, the deformable region aligned with a key of the first virtual keyboard and the second deformable region aligned with a key of a second virtual keyboard.

5. The dynamic tactile interface of claim 4, wherein the tactile layer and the substrate comprise a substantially transparent material; wherein the volume of fluid comprises a substantially transparent fluid of an index of refraction substantially similar to indices of refraction of the substrate and the tactile layer, the volume of fluid, the tactile layer, and the substrate communicating an image rendered by the display.

6. The dynamic tactile interface of claim 1, wherein the cavity is configured to receive the instrument and the second cavity is configured to receive a second instrument substantially simultaneously; wherein the instrument compresses the bladder and the second instrument compresses the second bladder substantially simultaneously to transition the deformable region from the retracted setting to the expanded setting and to transition the second deformable region from the retraced setting to the expanded setting substantially simultaneously.

7. The dynamic tactile interface of claim 1, further comprising a touch sensor coupled to the substrate and configured to output a signal corresponding to an input applied to the tactile layer.

8. A dynamic tactile interface comprising:
   a tactile layer defining a peripheral region and a deformable region adjacent the peripheral region, the deformable region operable between a retracted setting and an expanded setting, the deformable region tactilely distinguishable from the peripheral region in the expanded setting;
   a substrate comprising an attachment surface and coupled to the peripheral region, the substrate defining a fluid conduit adjacent the deformable region and a fluid channel fluidly coupled to the fluid conduit;
   a housing supporting the tactile layer and the substrate, configured to engage a computing device, and transiently retaining the substrate and the tactile layer over a surface of the computing device, the housing defining a cavity adjacent the computing device and configured to transiently receive an instrument, the cavity supporting the instrument in a first configuration and releasing the instrument in a second configuration; and
   a bladder fluidly coupled to the fluid channel and arranged within the cavity, the instrument compressing a portion of the bladder in the first configuration to displace fluid from the bladder into the fluid channel to transition the deformable region from the retracted setting to the expanded setting, the instrument releasing a portion of the bladder in the first configuration to displace fluid from the fluid channel and transition the deformable region from the expanded setting to the retracted setting, further comprising a second deformable region adjacent the peripheral region and the deformable region; wherein the substrate defines a second fluid conduit adjacent the second deformable region and a second fluid channel fluidly coupled to the second fluid conduit and the bladder; further comprising a valve fluidly coupled to the bladder, the fluid channel, and the second fluid channel, the valve selectively communicating fluid from the bladder to the fluid channel and the second fluid channel to selectively transition the deformable region and the second deformable region; wherein the cavity defines a first opening and a second opening, the cavity configured to receive the instrument into a first portion of the cavity through the first opening and configured to receive the instrument into a second portion of the cavity opposite the first portion through the second opening, the cavity supporting the bladder between the first portion and the second portion; and further comprising a first lever and a second lever, the first lever coupled to an inner surface of the first portion and the valve, the instrument engaging the first lever in the first portion of the cavity in the first configuration and actuating the valve to communicate fluid from the bladder to the fluid channel, the second lever coupled to an inner surface of the second portion and the valve, the instrument engaging the second lever in the first portion of the cavity in the first configuration and actuating the valve to communicate fluid from the bladder to the second fluid channel.

9. The dynamic tactile interface of claim 8, wherein the tactile layer comprises a first material of a first modulus of elasticity; wherein the substrate comprises a second material of a second modulus of elasticity greater than the first modulus of elasticity; and wherein the bladder comprises a membrane of a third modulus of elasticity greater than the first modulus of elasticity and lower than the second modulus of elasticity.

10. The dynamic tactile interface of claim 9, wherein the cavity is configured to receive the instrument defining an exterior cross-section substantially corresponding to and mating with a cross-section of the cavity, the instrument concentrically arranged within cavity in the first configuration.

11. The dynamic tactile interface of claim 8, further comprising a stop extending from an inner surface of the cavity and proximal the bladder, the stop configured to mate with a surface of the instrument in the first configuration to limit translation of the instrument into the cavity beyond the stop and to define a maximum displacement of fluid from the bladder.

12. The dynamic tactile interface of claim 8, further comprising a via fluidly coupling the fluid channel and the bladder and passing through a back surface of the substrate; wherein the cavity defines an open end and a closed end opposite the open end, the open end configured to receive the instrument into the cavity; wherein the bladder comprises an elastomer sheet bonded along a periphery to an inner surface of the cavity between the open end and the closed end, the bladder retaining fluid between the elastomer sheet and the closed end of the cavity coincident the via.

13. The dynamic tactile interface of claim 8, wherein the surface of the computing device comprises a display transiently coupled to a back surface of the substrate and selectively rendering an image of a virtual keyboard, the deformable region aligned with a key of the virtual keyboard.

14. The dynamic tactile interface of claim 8, wherein the bladder comprises an elongated cylindrical tube defining a closed end and an open end, the open end fluidly coupled to the fluid channel and opposite the closed end, the bladder defining an outer diameter; wherein the cavity defines an internal cross-section substantially corresponding to the outer diameter of the bladder, the bladder arranged concentrically within the cavity.

15. The dynamic tactile interface of claim 8, wherein the surface of the computing device comprises a rear surface of the computing device opposite a display of the computing device; further comprising a touch sensor coupled to the back surface of the substrate and arranged between the back surface of the substrate and the rear surface of the computing device configured to detect inputs applied to both the tactile layer and coincident the rear surface.

16. The dynamic tactile interface of claim 15, wherein the substrate and the tactile layer comprise a substantially opaque material.

17. The dynamic tactile interface of claim 8, further comprising a cover hinged to an edge of the housing, the cover pivotable about the hinge between a first cover position and a second cover position, the cover substantially flush with the tactile layer in the first cover position, the cover substantially flush with a back surface of the housing opposite the tactile layer in the second cover position; further comprising a gate transiently coupled to the cavity proximal an opening in the cavity and mechanically coupled to the cover, the cavity configured to receive the instrument through the opening, the gate operable between a closed position and an open position, the gate substantially covering the opening in the cavity in the closed position preventing receipt of the instrument into the cavity in response to the cover in the first cover position, the gate opening the opening of the cavity to receive the instrument into the cavity in response to the cover in the second cover position.

* * * * *